United States Patent
Tabuchi et al.

(10) Patent No.: US 10,737,569 B2
(45) Date of Patent: Aug. 11, 2020

(54) RESIN-MADE FUEL TANK

(71) Applicant: HONDA MOTOR CO., LTD., Tokyo (JP)

(72) Inventors: Daisuke Tabuchi, Wako (JP); Tomoyuki Matsumura, Wako (JP); Yuki Mizukura, Wako (JP); Tasuku Yamaguchi, Wako (JP); Ko Kurata, Wako (JP); Hikaru Yokomura, Wako (JP); Keigo Mine, Wako (JP); Atsushi Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 16/131,356

(22) Filed: Sep. 14, 2018

(65) Prior Publication Data
US 2019/0092161 A1    Mar. 28, 2019

(30) Foreign Application Priority Data

Sep. 28, 2017  (JP) ................................ 2017-188798
Oct. 31, 2017  (JP) ................................ 2017-210953

(51) Int. Cl.
*B62J 35/00*     (2006.01)
*B60K 15/03*    (2006.01)
(Continued)

(52) U.S. Cl.
CPC ........ *B60K 15/03177* (2013.01); *B29C 65/02* (2013.01); *B29C 66/1142* (2013.01);
(Continued)

(58) Field of Classification Search
CPC .... B60K 15/03177; B60K 15/03; B62J 35/00; B29C 66/301
See application file for complete search history.

(56) References Cited

U.S. PATENT DOCUMENTS 6,332,555 B1 * 12/2001 Stangier ........... B60K 15/03177
                                                    220/319
2002/0011271 A1  1/2002 Taurel et al.
(Continued)

FOREIGN PATENT DOCUMENTS

JP    S60-156029 U    10/1985
JP    S61-50829 A      3/1986
(Continued)

OTHER PUBLICATIONS

Japanese Office Action with English translation dated Mar. 19, 2019, JP 2017-210953, 7 pages.
(Continued)

*Primary Examiner* — Stephen J Castellano
(74) *Attorney, Agent, or Firm* — Rankin, Hill & Clark LLP

(57) ABSTRACT

A resin-made fuel tank includes: a resin-made fuel tank main body provided by joining an upper half and a lower half; a barrier sheet layer that is provided on an inner surface of the fuel tank main body and that reduces permeation of a fuel from the fuel tank main body; and a front mounting stay and rear mounting stays for mounting the fuel tank main body to a vehicle body. The front mounting stay and the rear mounting stays are provided on the fuel tank main body at positions vertically spaced from an upper joint surface and a lower joint surface at which the upper half and the lower half re joined to each other.

10 Claims, 26 Drawing Sheets

(51) Int. Cl.
*B29C 65/00* (2006.01)
*B29C 65/02* (2006.01)
*B29C 49/00* (2006.01)
*B29C 65/36* (2006.01)
*B29L 31/00* (2006.01)

(52) U.S. Cl.
CPC ............ B29C 66/301 (2013.01); B29C 66/54 (2013.01); B29C 66/71 (2013.01); B29C 66/72343 (2013.01); B60K 15/03 (2013.01); *B29C 49/0047* (2013.01); *B29C 65/3604* (2013.01); *B29C 66/1122* (2013.01); *B29C 66/61* (2013.01); *B29C 66/8322* (2013.01); *B29L 2031/7172* (2013.01); *B60K 2015/03046* (2013.01); *B60Y 2200/12* (2013.01)

(56) References Cited

U.S. PATENT DOCUMENTS

2006/0151505 A1* 7/2006 Kobayashi ........ B29C 45/14262
                                                          220/562
2009/0008177 A1* 1/2009 Sheahan ................. B62J 35/00
                                                          180/225

FOREIGN PATENT DOCUMENTS

| JP | H2-54728 U | 4/1990 |
| JP | 2003-54272 A | 2/2003 |
| JP | 2005-199884 | 7/2005 |
| JP | 2006-1381 A | 1/2006 |
| JP | 2006-143057 A | 6/2006 |
| JP | 2007-314072 | 12/2007 |
| JP | 2008-207736 A | 9/2008 |
| JP | 2008-238904 A | 10/2008 |
| JP | 2009-234403 A | 10/2009 |
| JP | 2016-68833 A | 5/2016 |
| JP | 2017-1598 A | 1/2017 |

OTHER PUBLICATIONS

Japanese Office Action with English translation dated May 7, 2019, JP 2017-188798, 13 pages.
Japanese Office Action with English translation dated Dec. 10, 2019, 7 pages.

* cited by examiner

FIG.8
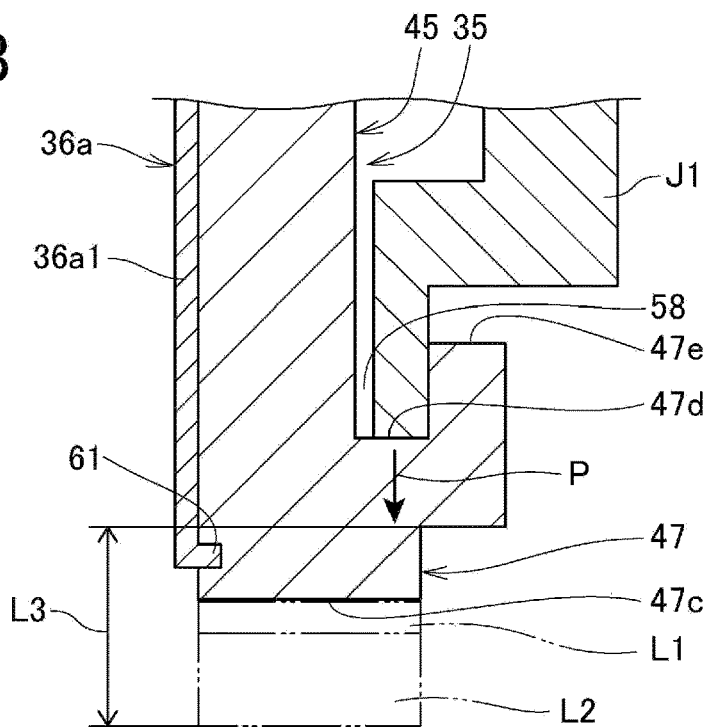
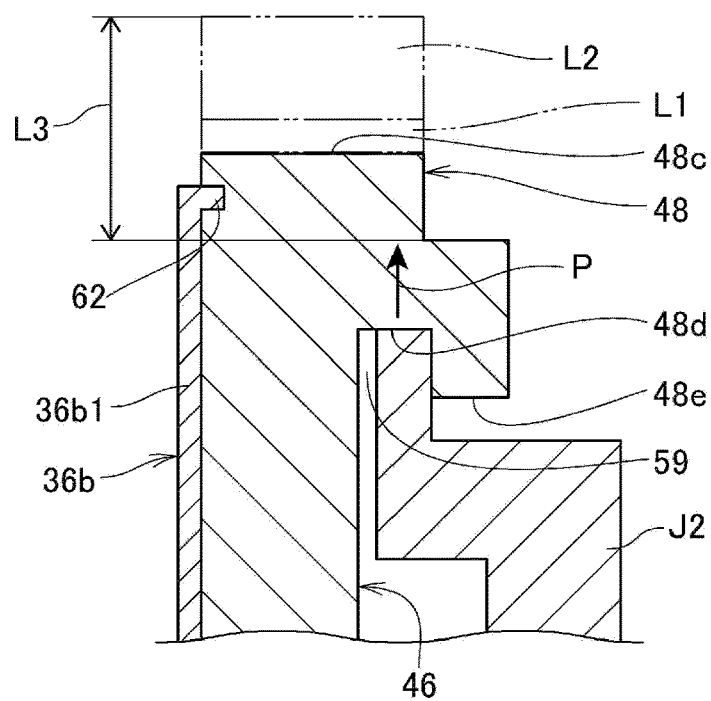

RESIN-MADE FUEL TANK

INCORPORATION BY REFERENCE

The present application claims priority under 35 U.S.C. § 119 to Japanese Patent Application No. 2017-188798 filed on Sep. 28, 2017 and Japanese Patent Application No. 2017-210953 filed on Oct. 31, 2017. The content of the applications is incorporated herein by reference in its entirety.

TECHNICAL FIELD

The present invention relates to a resin-made fuel tank.

BACKGROUND ART

Conventionally, there has been known a resin-made fuel tank including a resin-made fuel tank main body provided by joining an upper half and a lower half, a barrier sheet layer that is provided on substantially the whole part of an inner surface of the fuel tank main body and reduce permeation of a fuel, and mounting stays for mounting the fuel tank main body (see, for example, Patent Document 1). In Patent Document 1, the mounting stays extend outward from a joint portion of the upper half and the lower half.

PRIOR ART DOCUMENT

Patent Document

[Patent Document 1]
Japanese Patent Laid-Open No. 2007-314072

SUMMARY OF THE INVENTION

Problem to be Solved by the Invention

However, in the conventional resin-made fuel tank mentioned above, the mounting stays are continuous with the joint portion between the upper half and the lower half, and, therefore, a flexure of the mounting stay generated by an external force may influence the barrier sheet layer in the vicinity of the joint portion.

The present invention has been made in consideration of the above-mentioned circumstances. It is accordingly an object of the present invention to enable a barrier sheet layer, in a resin-made fuel tank, to be effectively protected against external forces.

Means for Solving the Problem

According to an aspect of the present invention, there is provided a resin-made fuel tank including: a resin-made fuel tank main body (35, 235, 335) provided by joining an upper half (45, 245, 345) and a lower half (46, 246 346); a barrier sheet layer (36, 336) that is provided on an inner surface of the fuel tank main body (35, 235, 335) and that reduces permeation of a fuel from the fuel tank main body (35, 235, 335); and a mounting stay (37, 38L, 38R, 237, 337) for mounting the fuel tank main body (35, 235, 335) to a vehicle body, in which the mounting stay (37, 38L, 38R, 237, 337) is provided on the fuel tank main body (35, 235, 335) at a position vertically spaced from a joint surface (47c, 48c, 247c, 248c, 347c, 348c) at which the upper half (45, 245, 345) and the lower half (46, 246, 346) are mated and joined to each other.

In addition, in the aspect of the invention as above, a plurality of the mounting stays (37, 38L, 38R) may be provided, and the plurality of mounting stays (37, 38L, 38R) may be spaced from one another in a vertical direction and a longitudinal vehicle direction.

Besides, in the aspect of the invention as above, the mounting stays (37, 38L, 38R) may be each provided on the upper half (45) and the lower half (46).

Further, in the aspect of the invention as above, the mounting stays (37, 38L, 38R) may include a front mounting stay (37) provided at a front portion of the fuel tank main body (35) and a rear mounting stay (38L, 38R) provided at a rear portion of the fuel tank main body (35), the front mounting stay (37) may be provided at a central portion in a left-right direction of the upper half (45), and a pair of the rear mounting stays (38L, 38R) may be provided at left and right portions of the lower half (46).

In addition, in the aspect of the invention as above, the mounting stay (37, 38L, 38R) may be provided with a mounting hole (72, 82) through which to pass a fixture (39a, 39b) fixed to the vehicle body, and the mounting stay (37, 38L, 38R) may be provided with a brittle portion (71a, 71b, 83b) in a vicinity of the mounting hole (72, 82).

Besides, in the aspect of the invention as above, the brittle portion (71a, 71b, 83b) may be a groove provided in a periphery of the mounting hole (72, 82).

In addition, in the aspect of the invention as above, the joint surface (47c, 48c) may be provided at a flange portion (47, 48) extending to outside of the fuel tank main body (35), and the mounting stay (37, 38L, 38R) may be provided with a rib (74, 83) extending from the flange portion (47, 48).

Besides, in the aspect of the invention as above, the barrier sheet layer (336) may be provided as a shaped body (50a) shaped along an inner surface of the fuel tank main body (335), and an outer surface (330a) of the fuel tank main body (335) that is opposite to the shaped body (50a) may be integrally molded with an exterior part (333, 380) connected to the outer surface (330a) by connection portions (385, 390b) that protrude outward and are spaced apart in a plane direction of the outer surface (330a).

In addition, in the aspect of the invention as above, the fuel tank main body (335) may be formed by injection molding in relation to the shaped body (50a).

Besides, in the aspect of the invention as above, the exterior part (380) may include connection bases (385) that project outward from the outer surface (330a), extend in a longitudinal direction of the fuel tank main body (335) and are spaced apart in a width direction, and flange portions (386) provided at end portions in regard of a projecting direction of the connection bases (385).

Further, in the aspect of the invention as above, the exterior part (333) may be a surrounding wall (390) that projects outward from the outer surface (330a) and surrounds a surface of the outer surface (330a), and the fuel tank main body (335) may be provided in its portion surrounded by the surrounding wall (390) with a liquid injection port (331).

In addition, in the aspect of the invention as above, the fuel tank main body (335) may be provided with a mounting stay (337) for fixing the fuel tank main body (335), and the surrounding wall (390) may be integrally connected to at least part of the mounting stay (337).

Besides, in the aspect of the invention as above, the mounting stay (337) may be provided with a stay main body section (370), and a reinforcement rib (371) that extends from the stay main body section (370) toward the injection port (331) side and is connected to the outer surface (330a), and the reinforcement rib (371) may be connected to the surrounding wall (390).

Effects of the Invention

The resin-made fuel tank according to the aspect of the present invention includes the resin-made fuel tank main body provided by joining the upper half and the lower half, the barrier sheet layer that is provided on the inner surface of the fuel tank main body and reduces permeation of the fuel from the fuel tank main body, and the mounting stay for mounting the fuel tank main body to the vehicle body, in which the mounting stay is provided on the fuel tank main body at a position vertically spaced from the joint surface at which the upper half and the lower half are mated and joined to each other.

According to this configuration, since the mounting stay is provided on the fuel tank main body at a position vertically spaced from the joint surface between the upper half and the lower half, an external force from the mounting stay can be restrained from influencing the barrier sheet layer in the vicinity of the joint surface. Therefore, the barrier sheet layer can be effectively protected from the external force.

In addition, a plurality of the mounting stays may be provided, and the plurality of mounting stays may be spaced from one another in the vertical direction and the longitudinal vehicle direction. According to this configuration, external forces acting on the fuel tank main body from the plurality of mounting stays can be dispersed to a wide range of the fuel tank main body. Therefore, the barrier sheet layer can be effectively protected against the external forces.

Besides, in the aspect of the invention as above, the mounting stays may be each provided on the upper half and the lower half. According to this configuration, external forces exerted on the fuel tank main body from the plurality of mounting stays are dispersed to the upper half and the lower half. Therefore, the barrier sheet layer can be effectively protected against the external forces.

Further, in the aspect of the invention as above, the mounting stays may include the front mounting stay provided at a front portion of the fuel tank main body and the rear mounting stay provided at a rear portion of the fuel tank main body, the front mounting stay may be provided at a central portion in a left-right direction of the upper half, and a pair of the rear mounting stays may be provided at left and right portions of the lower half. According to this configuration, external forces are dispersed from the front mounting stay at the front portion of the fuel tank main body and the rear mounting stays at the rear portions of the fuel tank main body, in the longitudinal vehicle direction, and are dispersed to the upper half and the lower half, in acting on the joint surface. For this reason, the barrier sheet layer can be protected effectively. Besides, since a three-point support at the front mounting stay and the left and right rear mounting stays is realized, the fuel tank main body can be firmly mounted effectively with a minimum configuration.

In addition, in the aspect of the invention as above, the mounting stay may be provided with the mounting hole through which to pass the fixture fixed to the vehicle body, and the mounting stay may be provided with the brittle portion in the vicinity of the mounting hole. According to this configuration, in the case where an excessive external force is exerted, the brittle portion of the mounting stay located at a position spaced from the joint surface is broken precedingly to the joint surface. For this reason, the barrier sheet layer in the fuel tank main body can be protected.

Besides, in the aspect of the invention as above, the brittle portion may be a groove provided in the periphery of the mounting hole. According to this configuration, the brittle portion can be compactly provided at a position remote from the joint surface, and external forces exerted on the joint surface from the mounting stay are reduced, so that the barrier sheet layer can be protected.

In addition, in the aspect of the invention as above, the joint surface may be provided at the flange portion extending to outside of the fuel tank main body, and the mounting stay may be provided with the rib extending from the flange portion. According to this configuration, the strength and rigidity of the mounting stay can be set higher than those of the flange portion and the rib. Therefore, the fuel tank main body can be firmly supported by the mounting stay.

Besides, in the aspect of the invention as above, the barrier sheet layer may be provided as the shaped body shaped along the inner surface of the fuel tank main body, and the outer surface of the fuel tank main body that is opposite to the shaped body may be integrally molded with the exterior part connected to the outer surface by the connection portions that protrude outward and are spaced apart in the plane direction of the outer surface. According to this configuration, since the outer surface of the fuel tank main body that is opposite to the barrier sheet layer provided as the shaped body is integrally molded with the exterior part protruding outward, the exterior part can be provided on the outer surface with a high degree of freedom. Further, since the exterior part connected to the outer surface of the fuel tank main body by the connection portions spaced apart in the plane direction of the outer surface functions as a reinforcement rib and deformation of the fuel tank main body under external forces can be thereby restrained effectively, deformation of the barrier sheet layer can be restrained. Besides, since the fuel tank main body and the exterior part are formed integrally on the outer surface of the fuel tank main body that is opposite to the shaped body, generation of a notch on the inner surface side of the fuel tank main body due to an influence of the exterior part can be prevented, and a uniform barrier sheet layer can be formed even at the part where the exterior part is provided. Therefore, permeation of the fuel from the fuel tank main body can be reduced effectively.

In addition, in the aspect of the invention as above, the fuel tank main body may be formed by injection molding in relation to the shaped body. According to this configuration, since the fuel tank main body is formed by injection molding in relation to the barrier sheet layer of the shaped body, generation of a notch on the inner surface side of the fuel tank main body can be prevented, and a uniform barrier sheet layer can be formed. In addition, the degree of freedom in molding is enhanced, and the shape of the exterior part formed integrally with the fuel tank main body can be diversified.

Besides, in the aspect of the invention as above, the exterior part may include connection bases that project outward from the outer surface, extend in the longitudinal direction of the fuel tank main body and are spaced apart in the width direction, and flange portions provided at end portions in regard of the projecting direction of the connection bases. According to this configuration, the fuel tank main body can be effectively reinforced along the longitudinal direction of the fuel tank main body by the connection bases of the exterior part that extend in the longitudinal direction, and adjustment of strength by the length of the connection bases can also be performed. In addition, since the connection bases are spaced apart in the width direction, the fuel tank main body can be reinforced in the width direction.

Further, in the aspect of the invention as above, the exterior part may be the surrounding wall that projects outward from the outer surface and surrounds the surface of the outer surface, and the fuel tank main body may be provided in its portion surrounded by the surrounding wall with the liquid injection port. According to this configuration, the surrounding wall that surrounds the injection port can be used as a tray for the liquid spilling from the injection port, a tray part for exclusive use can be omitted, and the number of component parts can be reduced. Further, the fuel tank main body can be reinforced with the surrounding wall, and deformation of the barrier sheet layer can be restrained.

In addition, in the aspect of the invention as above, the fuel tank main body may be provided with the mounting stay for fixing the fuel tank main body, and the surrounding wall may be integrally connected to at least part of the mounting stay. According to this configuration, since the mounting stay can be reinforced with the surrounding wall, support rigidity of the fuel tank main body is enhanced, and the capacity of the fuel tank main body can be enlarged.

Besides, in the aspect of the invention as above, the mounting stay may be provided with the stay main body section, and the reinforcement rib that extends from the stay main body section toward the injection port side and is connected to the outer surface, and the reinforcement rib may be connected to the surrounding wall. According to this configuration, the mounting stay can be reinforced with the reinforcement rib, and the surrounding wall and the mounting stay can be connected through the reinforcement rib even in the case where the mounting stay and the injection port are spaced apart from each other.

BRIEF DESCRIPTION OF THE DRAWINGS

FIG. 8 is a sectional view depicting a state before joining, in FIG. 7.

MODES FOR CARRYING OUT THE INVENTION

Figure 1:
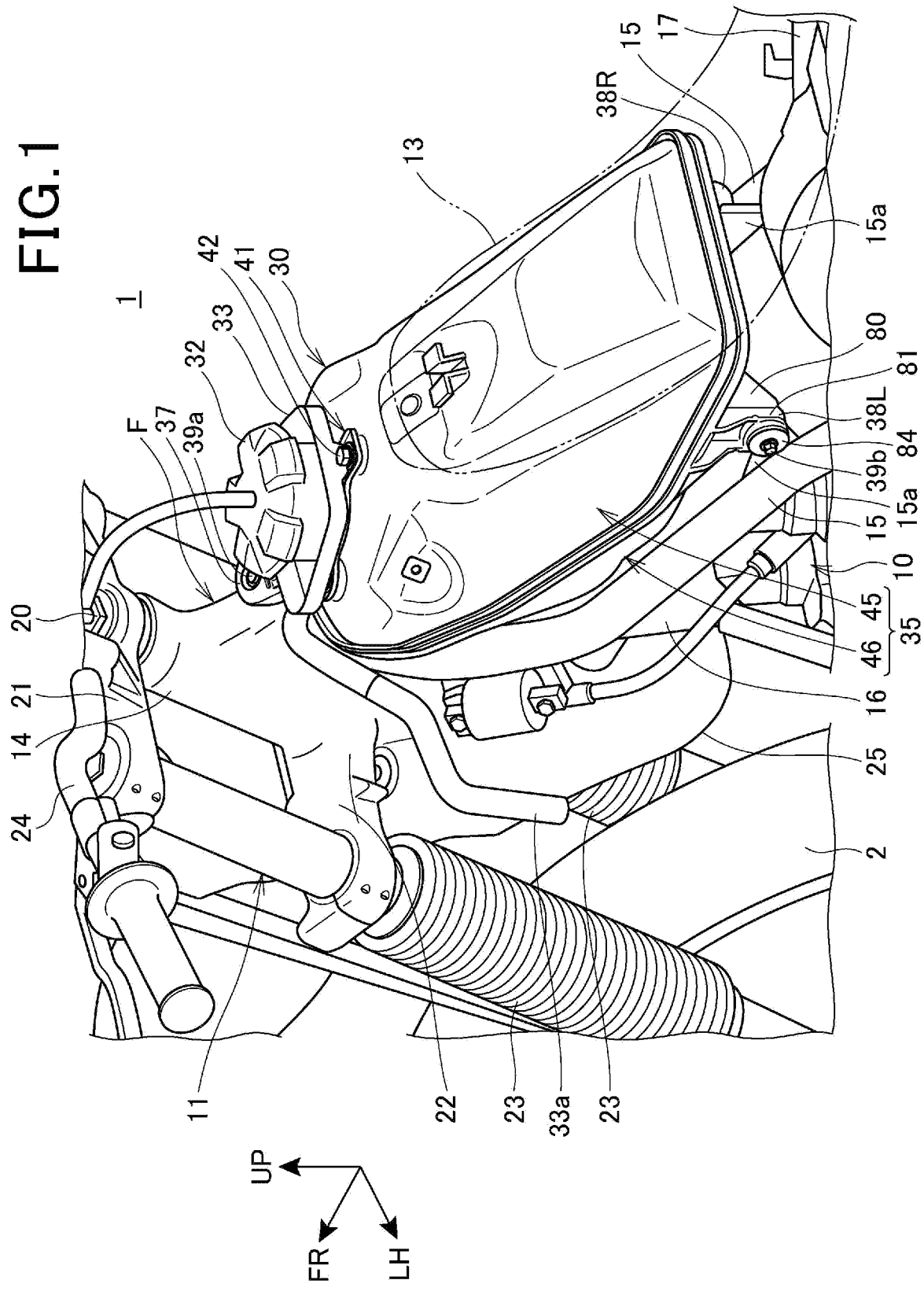
FIG. 1 is a perspective view, as viewed from a left rear side, of a front portion of a motorcycle according to a first embodiment of the present invention.

Embodiments of the present invention will be described below, referring to the drawings. Note that the directions such as forward, rearward, leftward, rightward, upward and downward directions in the following description are the same as those directions with respect to the vehicle body, unless otherwise specified. In addition, reference symbol FR in each drawing indicates the front side of the vehicle body, reference symbol UP indicates the upper side of the vehicle body, and reference symbol LH indicates the left-hand side of the vehicle body.

First Embodiment

FIG. 1 is a perspective view, as viewed from a left rear side, of a front portion of a motorcycle according to a first embodiment of the present invention.

The motorcycle 1 is a vehicle in which an engine 10 as a power unit is supported on a body frame F, a steering system 11 steerably supporting a front wheel 2 is steerably supported on a front end of the body frame F, and a swing arm (not depicted) supporting a rear wheel (not depicted) is provided at a rear side of the body frame F. The motorcycle 1 is a saddle riding vehicle in which a seat 13 on which a driver is seated astride is provided on an upper side of a rear portion of the body frame F.

The body frame F includes a head pipe section 14, a pair of left and right main frames 15, 15, a down frame 16, a pair of left and right pivot frames (not depicted), a pair of left and right seat frames 17, 17 (the seat frame on the left side is not depicted), and a pair of left and right sub-frames (not depicted).

The head pipe section 14 is provided at a front end of the body frame F.

The main frames 15, 15 extend rearwardly downward from the head pipe section 14.

The down frame 16 extending downward from a lower position of the main frames 15, 15 in the head pipe section 14, is bent on a rear side of the front wheel 2, and extends rearward.

The pivot frames extend downward from rear end portions of the main frames 15, 15, and are connected to a rear end of the down frame 16.

The seat frames 17, 17 extend rearward from rear end portions of the main frames 15, 15.

The sub-frames extend rearwardly upward from the pivot frames, and are connected to rear portions of the seat frames 17, 17.

The steering system 11 includes a steering shaft 20 rotatably supported on the head pipe section 14, a top bridge 21 fixed to an upper end of the steering shaft 20, a bottom bridge 22 fixed to a lower end of the steering shaft 20, a pair of left and right front forks 23, 23 supported by the top bridge 21 and the bottom bridge 22, and a steering handlebar 24 fixed to the top bridge 21.

The front wheel 2 is rotatably supported on lower end portions of the front forks 23, 23. A front fender 25 is supported on the bottom bridge 22.

The engine 10 is located on a lower side of the main frames 15, 15, and is disposed between the down frame 16 and the pivot frames in the longitudinal vehicle direction.

The seat 13 is disposed on an upper side of the seat frames 17, 17, and is supported by the seat frames 17, 17.

A fuel tank 30 (resin-made tank) is disposed on an upper side of the main frames 15, 15 so as to lie along the main frames 15, 15, and is supported by the main frames 15, 15. The fuel tank 30 is disposed between the head pipe section 14 and the seat 13 in the longitudinal vehicle direction. A front end portion of the seat 13 covers an upper surface of a rear portion of the fuel tank 30 from an upper side.

Figure 2:
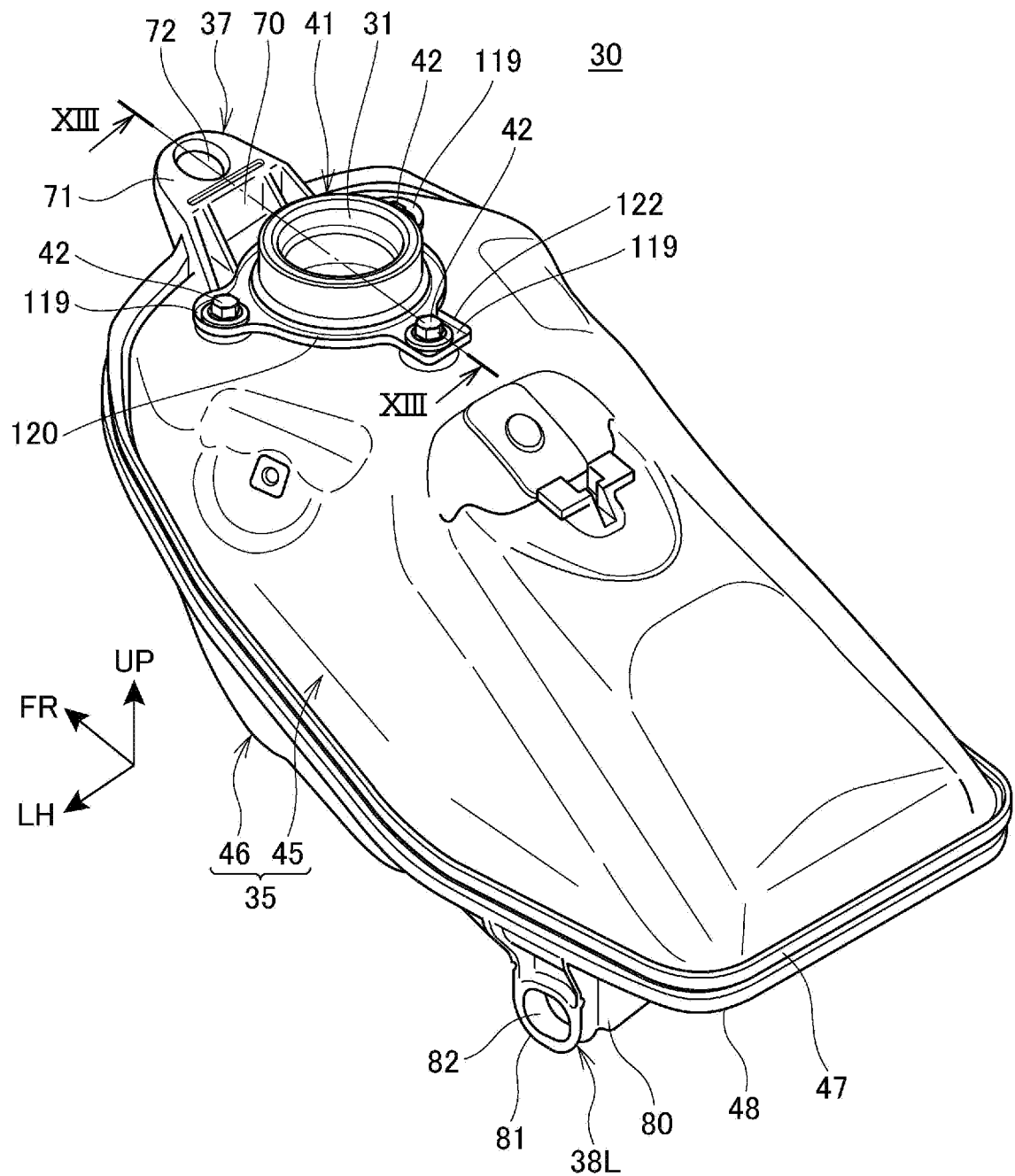
FIG. 2 is a perspective view of a fuel tank as viewed from a left upper side.

FIG. 2 is a perspective view of the fuel tank 30, as viewed from a left upper side.

As depicted in FIGS. 1 and 2, an oil filler port 31 is provided at an upper surface of a front portion of the fuel tank 30. A tank cap 32 is attached to the oil filler port 31, and the oil filler port 31 is closed with the tank cap 32.

A tray 33 surrounding the oil filler port 31 from the periphery is attached to the fuel tank 30. The tray 33 is disposed between a lower end of the tank cap 32 and an upper surface of the fuel tank 30.

The tray 33 is provided with a drain pipe 33a extending downward. A fuel spilling at the time of oil supply or the like is received by the tray 33, and is discharged downward through the drain pipe 33a.

Figure 3:
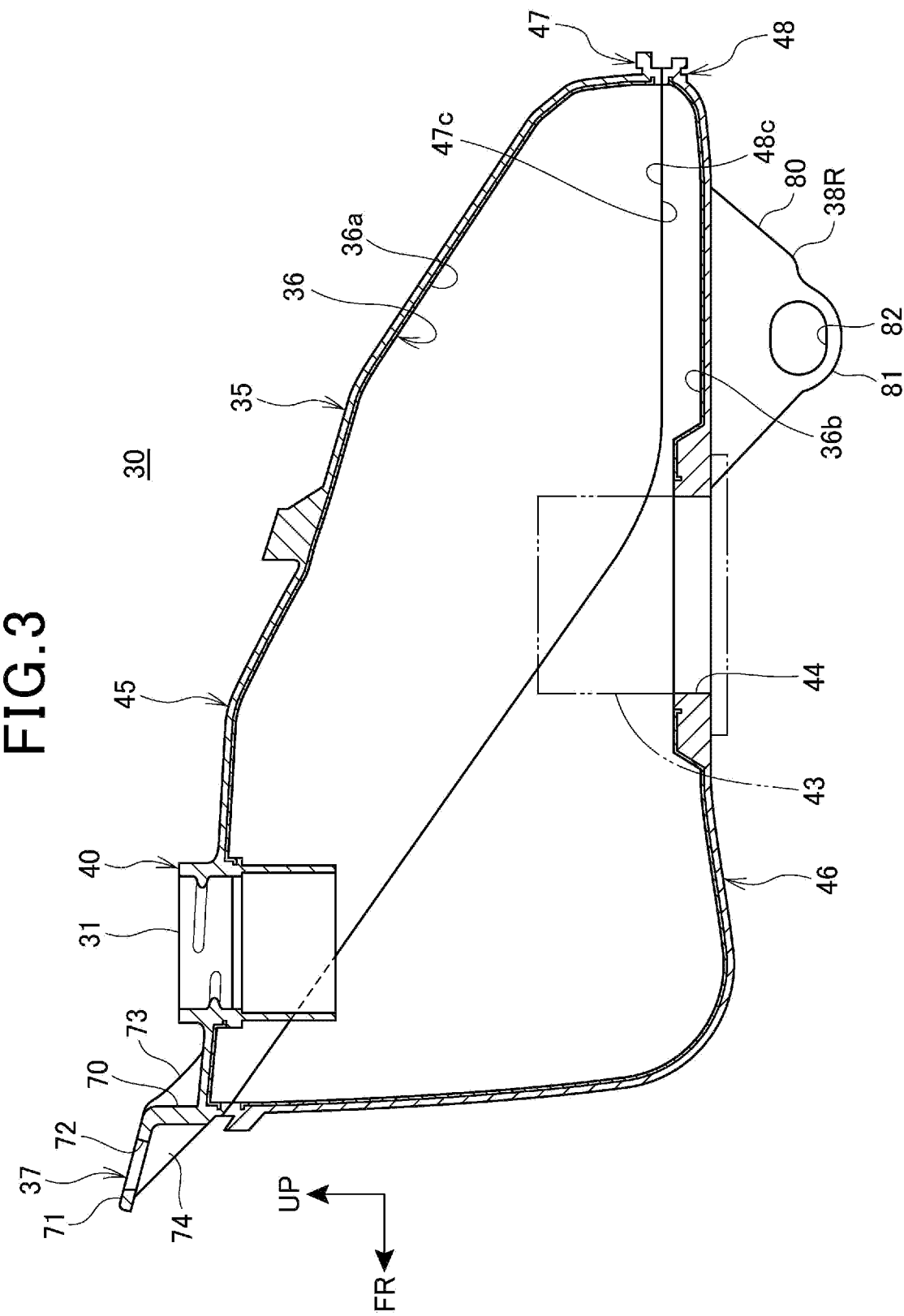
FIG. 3 is a sectional view of the fuel tank, taken at the center of the vehicle width.
Figure 4:
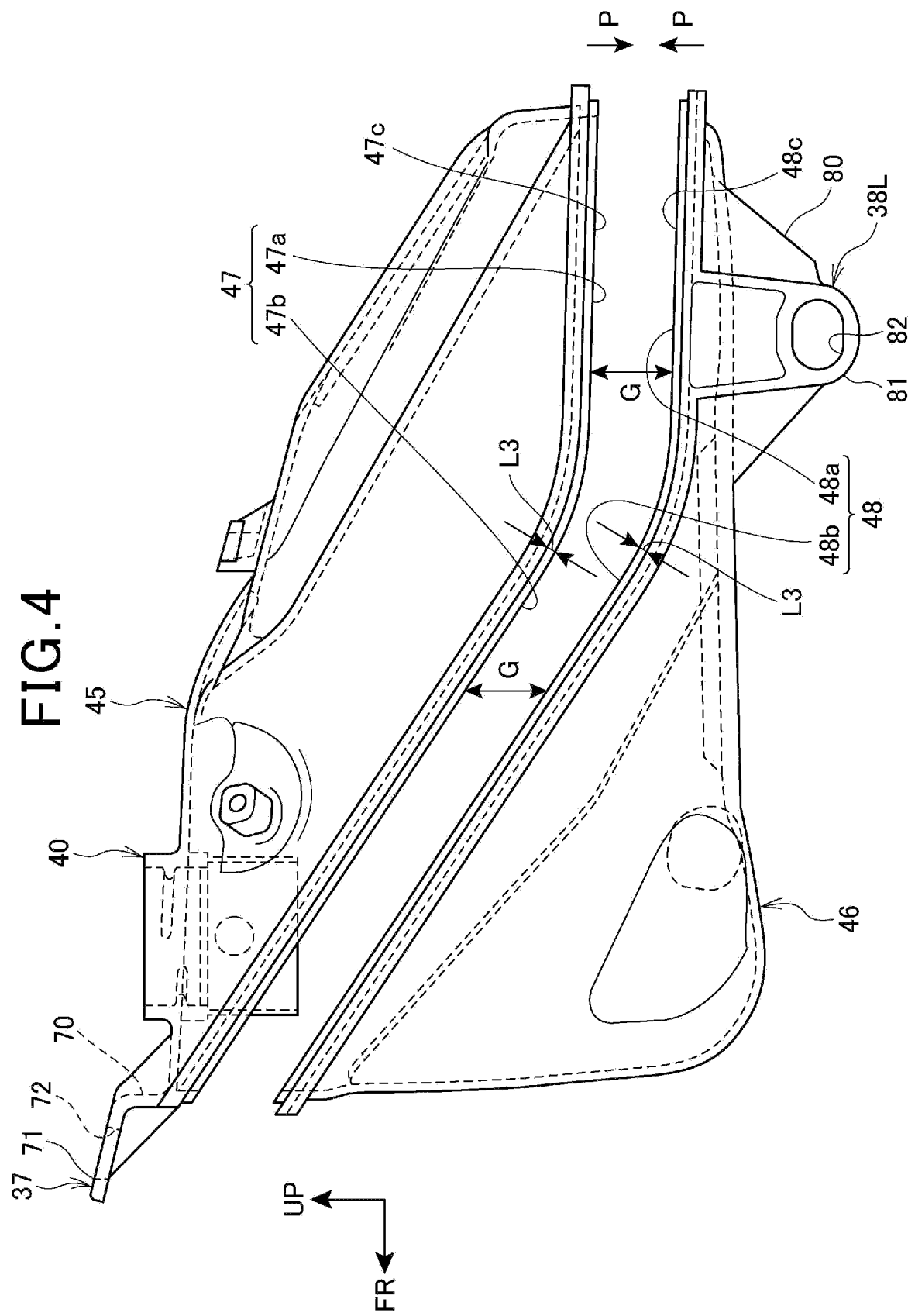
FIG. 4 is a left side view depicting a state in which the fuel tank is divided.

FIG. 3 is a sectional view of the fuel tank 30, taken at the center of the vehicle width. FIG. 4 is a left side view depicting a state in which the fuel tank 30 is divided.

Referring to FIGS. 2 to 4, the fuel tank 30 includes a resin-made fuel tank main body 35 (tank main body), and a barrier sheet layer 36 provided over substantially the whole part of an inner surface of the fuel tank main body 35.

The barrier sheet layer 36 is formed from a material which is lower in fuel permeability than a material constituting the fuel tank main body 35. The barrier sheet layer 36 restrains the fuel, such as gasoline, reserved in the fuel tank 30 from permeating the fuel tank 30 to leak to the exterior.

A front mounting stay 37 (mounting stay) projecting forward is provided at an upper portion of a front portion of the fuel tank main body 35.

The front portion of the fuel tank main body 35 is fixed to an upper surface of a rear portion of the head pipe section 14, by a tank fixture 39a (fixture, see FIG. 1) inserted in and passed through the front mounting stay 37 from above.

A pair of left and right rear mounting stays 38L, 38R (mounting stays) projecting downward are provided at lower portions of a rear portion of the fuel tank main body 35.

The main frames 15, 15 are provided at their rear portions with tank stays 15a, 15a (see FIG. 1) extending upward.

Rear portions of the fuel tank main body 35 are fixed to the tank stays 15a, 15a, by tank fixtures 39b, 39b (fixtures, see FIG. 1) inserted in and passed through the rear mounting stays 38L, 38R from transversely outer sides, respectively.

The fuel tank main body 35 is provided at an upper portion of a front portion thereof with a cylindrical injection section 40 for fuel injection (liquid injection). The cylindrical injection section 40 is a cylinder extending vertically, and an upper end portion of the cylindrical injection section 40 forms the oil filler port 31.

The cylindrical injection section 40 is formed from the same resin material as the resin material constituting the fuel tank main body 35, and is formed integrally with the fuel tank main body 35.

As depicted in FIG. 2, a metallic mouthpiece 41 (not depicted in FIGS. 3 and 4) is attached to the cylindrical injection section 40. The mouthpiece 41 is fixed to an upper surface of the fuel tank main body 35, by a plurality of mouthpiece fixtures 42 (fixtures) inserted and passed from above.

In addition, the fuel tank main body 35 is provided at a lower surface thereof with a pump mounting opening 44 to which a fuel pump 43 is to be mounted.

The fuel tank main body 35 is divided into an upper half 45 (divided body, a divided body on one side) constituting an upper portion of the fuel tank main body 35, and a lower half 46 (divided body, a divided body on the other side) constituting a lower portion of the fuel tank main body 35. The fuel tank main body 35 is formed in a tank shape by joining the upper half 45 and the lower half 46 to each other.

The upper half 45 is formed in a case shape which is opening at the lower surface to the lower side. A peripheral edge portion of the opening on the lower surface of the upper half 45 is an upper joint portion 47 (flange portion) to be joined to the lower half 46. In side view of the vehicle, the upper joint portion 47 includes a flat surface portion 47a extending substantially horizontally at a rear portion, and a slant surface portion 47b extending forwardly upward at an inclination relative to the flat surface portion 47a.

The front mounting stay 37 is provided at a front end portion of the upper half 45. The cylindrical injection section 40 is provided at an upper surface of a front portion of the upper half 45.

The lower half 46 is formed in a case shape which is opening at the upper surface to the upper side. A peripheral edge portion of the opening on the upper surface of the lower half 46 is a lower joint portion 48 (flange portion) to be joined to the upper half 45. In side view of the vehicle, the lower joint portion 48 includes a flat surface portion 48a parallel to the flat surface portion 47a, and a slant surface portion 48b parallel to the slant surface portion 47b. The flat surface portion 47a is joined to the flat surface portion 48a, and the slant surface portion 47b is joined to the slant surface portion 48b.

The rear mounting stays 38L, 38R are provided at rear portions of the lower half 46. The pump mounting opening 44 is provided in a lower surface of the lower half 46.

More in detail, the upper half 45 and the lower half 46 are united by welding together at a part where an upper joint surface 47c (joint surface) composed of the lower surface of the upper joint portion 47 of the upper half 45 and a lower joint surface 48c (joint surface) composed of the upper surface of the lower joint portion 48 of the lower half 46 are mated.

The barrier sheet layer 36 includes an upper barrier sheet layer 36a (a barrier sheet layer on one side) bonded to an inner surface of the upper half 45, and a lower barrier sheet layer 36b (a barrier sheet layer on the other side) bonded to an inner surface of the lower half 46.

Figure 5:
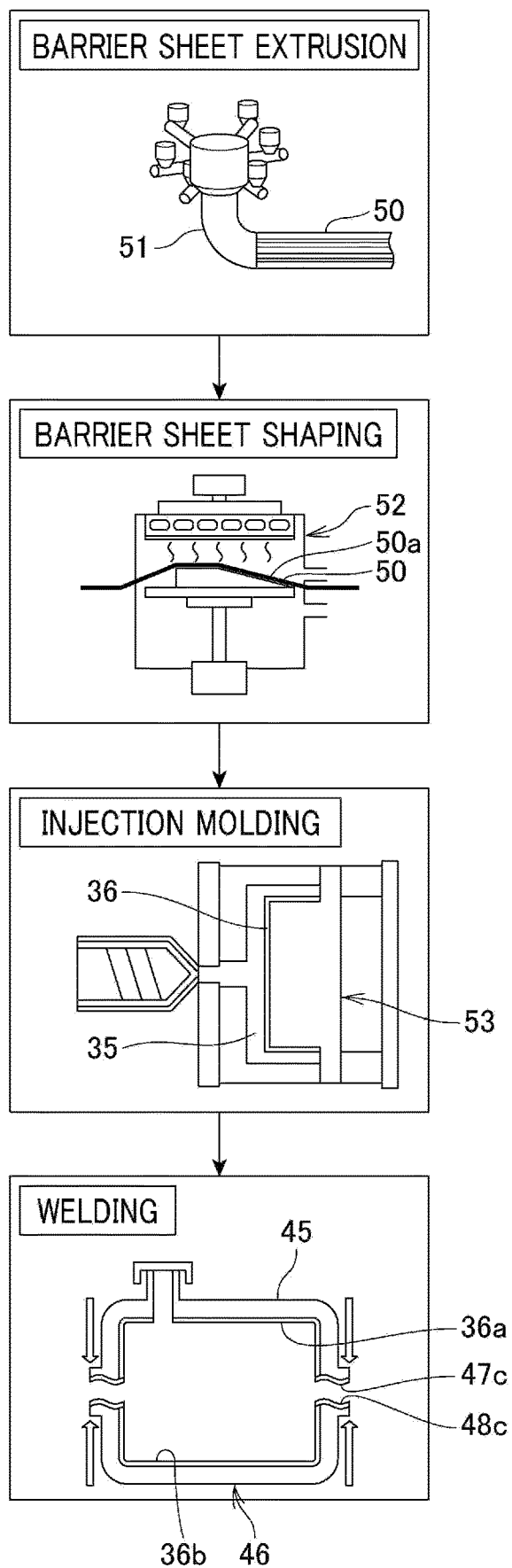
FIG. 5 depicts schematic views illustrating manufacturing steps of a fuel tank main body.

FIG. 5 depicts schematic drawings depicting manufacturing steps of the fuel tank main body 35.

Referring to FIG. 5, a plurality of materials for constituting the barrier sheet layer 36 are supplied to an extrusion die 51, and a sheet-shaped molded body 50 is extruded from the die 51.

The molded body 50 is shaped into a shape along the inner surface of the fuel tank main body 35 by a vacuum forming machine 52. Specifically, the molded body 50 is shaped into a shape along the inner surface of the fuel tank main body 35 by the vacuum forming machine 52 and is solidified, to be a shaped body 50a. The thus shaped barrier sheet layer 36 (shaped body 50a) is subjected to trimming of a peripheral edge portion by a trimming die (not depicted).

The trimmed barrier sheet layer 36 is set in an injection mold 53 for molding the fuel tank main body 35, and is integrated with the fuel tank main body 35 at the time of injection molding of the fuel tank main body 35. In other words, the barrier sheet layer 36 is bonded to the inner surface of the fuel tank main body 35 by insert molding.

Here, the upper barrier sheet layer 36a and the lower barrier sheet layer 36b are molded separately.

The upper barrier sheet layer 36a is bonded to the upper half 45 at the time of injection molding of the upper half 45, and the lower barrier sheet layer 36b is bonded to the lower half 46 at the time of injection molding of the lower half 46.

Thereafter, the upper joint surface 47c and the lower joint surface 48c are melted by heating, and the upper joint surface 47c and the lower joint surface 48c are press bonded to each other, whereby the upper half 45 and the lower half 46 are united together.

Figure 6:
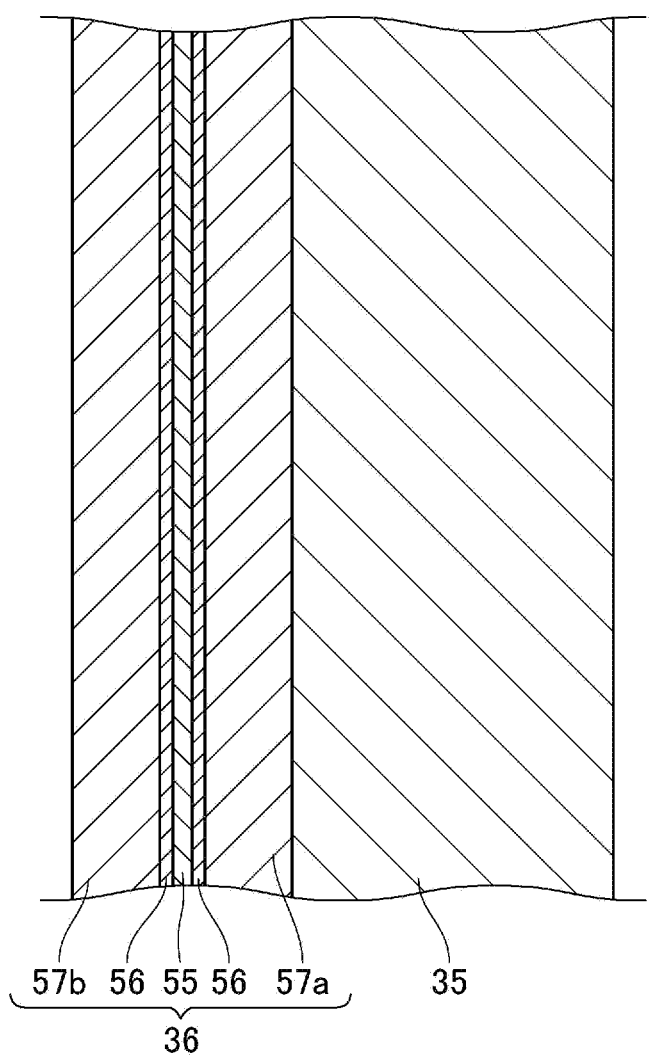
FIG. 6 is a sectional view depicting a configuration in a plate thickness direction of the fuel tank.

FIG. 6 is a sectional view depicting a configuration in a plate thickness direction of the fuel tank 30.

The fuel tank 30 is configured in six layers, including one layer constituting the fuel tank main body 35 and five layers constituting the barrier sheet layer 36.

The barrier sheet layer 36 includes a barrier layer 55, adhesive layers 56, 56 that are provided on both sides of the barrier layer 55, and outer layers 57a, 57b that are adhered to both sides of the barrier layer 55 through the adhesive layers 56, 56.

The material of the fuel tank main body 35 is, for example, high-density polyethylene (HDPE).

The barrier layer 55 is formed from a material lower in fuel permeability than high-density polyethylene. The barrier layer 55 is formed from, for example, ethylene-vinyl alcohol copolymer (EVOH).

The outer layers 57a, 57b are formed from the same material as that of the fuel tank main body 35, for example, high-density polyethylene.

The barrier sheet layer 36 is bonded to the inner surface of the fuel tank main body 35 through the outer layer 57a on the fuel tank main body 35 side. Since the barrier sheet layer 36 is bonded to the inner surface of the fuel tank main body 35 through the outer layer 57a formed of the same material as that of the fuel tank main body 35, adhesion of the barrier sheet layer 36 to the fuel tank main body 35 is high, and the barrier sheet layer 36 is firmly bonded to the fuel tank main body 35.

The barrier sheet layer 36 has the outer layer 57b exposed to the inside of the fuel tank main body 35 and contacting the fuel.

For this reason, direct contact of the fuel with the barrier layer 55 is prevented from occurring.

Figure 7:
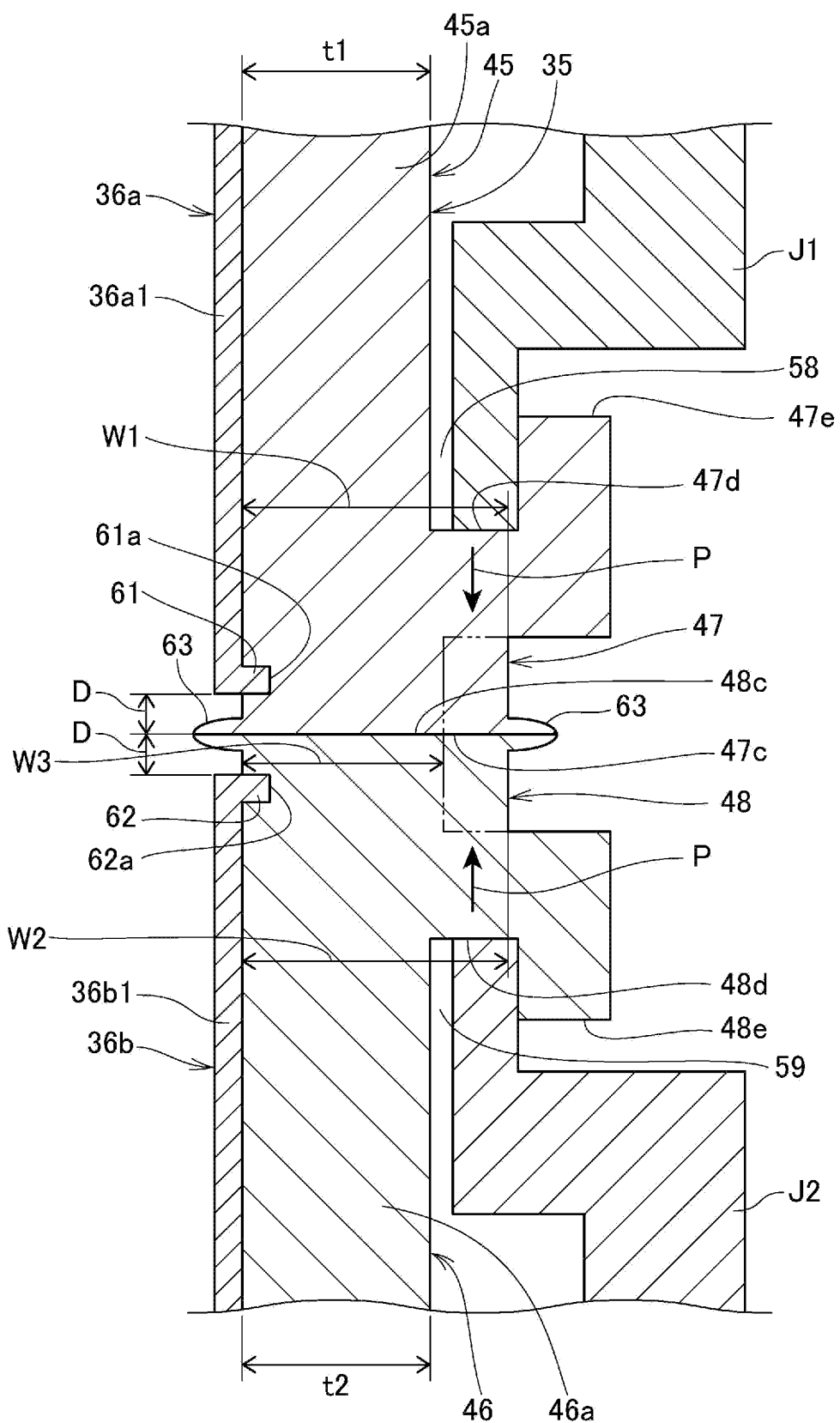
FIG. 7 is a sectional view of a part at which an upper half and a lower half are joined to each other, of flat surface portions.

FIG. 7 is a sectional view of a part at which the upper half 45 and the lower half 46 are joined to each other, of the flat surface portions 47a, 48a.

The upper joint portion 47 is formed in a flange shape projecting from an outer surface of the upper half 45 to the outside of the fuel tank main body 35. The upper joint portion 47 is provided over the whole circumference of the upper half 45.

The width W1 of the upper joint portion 47 is greater than the thickness t1 of a side wall portion 45a (wall portion) of the upper half 45.

A pressing surface 47d parallel to the upper joint surface 47c is formed at an upper surface of a tip portion of the flange-shaped upper joint portion 47.

In addition, the upper half 45 has a peripheral edge rib 47e extending upward from an upper portion of a tip end surface of the upper joint portion 47. The peripheral edge rib 47e is provided over substantially the whole circumference of the upper half 45.

The pressing surface 47d is a bottom surface of a groove 58 formed between the peripheral edge rib 47e and an outer surface of the upper half 45.

The upper half 45 is pressed against the lower joint surface 48c of the lower half 46, by a pressing jig J1 that engages with the groove 58 and presses the pressing surface 47d.

The pressing surface 47d overlaps with the upper joint surface 47c in a pressing direction P of the pressing jig J1. For this reason, the upper joint surface 47c can be pressed directly by the pressing jig J1, whereby good press bonding can be achieved.

The lower joint portion 48 is formed in a flange shape projecting from an outer surface of the lower half 46 to the outside of the fuel tank main body 35. The lower joint portion 48 is provided over the whole circumference of the lower half 46.

The width W2 of the lower joint portion 48 is greater than the thickness t2 of a side wall portion 46a (wall portion) of the lower half 46.

A pressing surface 48d parallel to the lower joint surface 48c is formed at a lower surface of a tip portion of the flange-shaped lower joint portion 48.

Besides, the lower half 46 has a peripheral edge rib 48e extending downward from a lower portion of a tip end surface of the lower joint portion 48. The peripheral edge rib 48e is provided over substantially the whole circumference of the lower half 46.

The pressing surface 48d is a bottom surface of a groove 59 formed between the peripheral edge rib 48e and an outer surface of the lower half 46.

The lower half 46 is pressed against the upper joint surface 47c of the upper half 45, by a pressing jig J2 that engages with the groove 59 and presses the pressing surface 48d.

The pressing surface 48d overlaps with the lower joint surface 48c in a pressing direction P of the pressing jig J2. For this reason, the lower joint surface 48c can be pressed directly by the pressing jig J2, whereby good press bonding can be achieved.

The pressing direction P is the joining direction of the upper half 45 and the lower half 46.

An end edge of the upper barrier sheet layer 36a is provided in the vicinity of the upper joint surface 47c, and the end edge is formed with a bent portion 61 bent toward the outside of the fuel tank main body 35.

The bent portion 61 is bent substantially at a right angle relative to a main body portion 36a1 of the upper barrier sheet layer 36a along the inner surface of the upper half 45.

More in detail, the bent portion 61 is embedded in the inner surface of the upper half 45, at a position spaced upward by a distance D from the upper joint surface 47c. The bent portion 61 extends in parallel to the upper joint surface 47c toward the outside of the fuel tank main body 35.

The bent portion 61 is disposed between the pressing surface 47d and the upper joint surface 47c, in the pressing direction P. The length of the bent portion 61 is smaller than the thickness t1 of the side wall portion 45a.

An end edge of the lower barrier sheet layer 36b is provided in the vicinity of the lower joint surface 48c, and the end edge is formed with a bent portion 62 bent toward the outside of the fuel tank main body 35.

The bent portion 62 is bent at substantially a right angle relative to a main body portion 36b1 of the lower barrier sheet layer 36b along the inner surface of the lower half 46.

More in detail, the bent portion 62 is embedded in the inner surface of the lower half 46, at a position spaced downward by a distance D from the lower joint surface 48c. The bent portion 62 extends in parallel to the lower joint surface 48c toward the outside of the fuel tank main body 35.

The bent portion 62 is disposed between the pressing surface 48d and the lower joint surface 48c, in the pressing direction P. The length of the bent portion 62 is smaller than the thickness t2 of the side wall portion 46a.

The bent portions 61, 62 are formed by a method in which bent portions at peripheral edge portions of the molded body 50 formed at the time of shaping by the vacuum forming machine 52 (FIG. 5) are trimmed by a cutting edge of the above-mentioned trimming die (see paragraph 0023). At the tips of the bent portions 61, 62, there are formed cut surfaces 61a, 62a trimmed in the thickness direction of the bent portions 61, 62 by the cutting edge. Therefore, the bent portions 61, 62 can be easily formed, and the bent portions 61, 62 can be formed with high accuracy.

The bent portions 61, 62 are embedded in the upper half 45 and the lower half 46 at the time of molding the upper half 45 and the lower half 46 by the injection mold 53 (FIG. 5). Therefore, the bent portions 61, 62 can be easily embedded.

FIG. 8 is a sectional view depicting a state before joining, in FIG. 7.

As depicted in FIG. 8, in the state of joining, the upper joint portion 47 is formed to be thicker in the pressing direction P by a press bonding margin L1 and a melting margin L2.

Similarly, in the state before joining, the lower joint portion 48 is formed to be thicker in the pressing direction P by a press bonding margin L1 and a melting margin L2.

The melting margin L2 is a part melted at the time of heating the upper joint portion 47 and the lower joint portion 48 to the portion of the press bonding margin L1, and is not left in a finished product of the fuel tank main body 35.

The press bonding margin L1 is a part press bonded at the time of welding, and part of the portion of the press bonding margin L1 becomes protruding portions 63, 63 (FIG. 7) protruding from the upper joint surface 47c and the lower joint surface 48c under pressure.

The bent portions 61, 62 of the barrier sheet layers 36 are vertically spaced from the protruding portions 63 on the outer side.

In the first embodiment, the bent portions 61, 62 of the barrier sheet layers 36 are vertically spaced from the upper joint surface 47c and the lower joint surface 48c, respectively, and are not welded to the upper joint surface 47c and the lower joint surface 48c. As a result, at the time of welding the upper joint surface 47c and the lower joint surface 48c to each other, it is unnecessary to control welding as to the upper barrier sheet layer 36a and the lower barrier sheet layer 36b, and, accordingly, the upper half 45 and the lower half 46 can be welded easily.

In addition, a region where the barrier sheet layer 36 is absent is present between the bent portion 61 and the bent portion 62, but this region is so small that permeation of the fuel to the outside through this region is allowed.

As depicted in FIG. 8, the upper joint portion 47 and the lower joint portion 48 each have a projecting margin part extending from an end of the peripheral edge rib 47e, 48e in the pressing direction P to a tip of the melting margin L2. The length of this projecting margin part is a projecting margin size L3. The projecting margin size L3 is the length in a direction orthogonal to the upper joint surface 47c and the lower joint surface 48c. Note that the projecting margin size L3 may be, for example, the length from the pressing surfaces 47d, 48d to the tip of the melting margin L2.

As depicted in FIG. 4, at the time of moving the upper half 45 and the lower half 46 in the pressing direction P attendantly on welding, in a state in which the flat surface portion 47a of the upper joint portion 47 and the flat surface portion 48a of the lower joint portion 48 are set parallel to each other, the size of a gap G between the upper joint surface 47c and the lower joint surface 48c is equal everywhere. In other words, the gap G between the flat surface portion 47a and the flat surface portion 48a and the gap G between the slant surface portion 47b and the slant surface portion 48b are equal in size. Here, the gap G is a gap in the pressing direction P. For this reason, a pressing force in the pressing direction P can be evenly exerted on the whole parts of the upper joint portion 47 and the lower joint portion 48.

In addition, the projecting margin size L3 is equal over the whole circumference of the upper joint portion 47 and over the whole circumference of the lower joint surface 48c.

Since the slant surface portions 47b, 48b are slanted relative to the pressing direction P, the pressing forces exerted on the slant surface portions 47b, 48b at the time of welding are smaller than the pressing forces exerted on the flat surface portions 47a, 48a.

In the first embodiment, referring to FIG. 7, the width W3 (the part of imaginary line in FIG. 7) of the upper joint portion 47 and the lower joint portion 48 of the parts of the slant surface portions 47b, 48b (FIG. 4) is smaller than the widths W1, W2 of the parts of the flat surface portions 47a, 48a.

As a result, the areas of the upper joint surface 47c and the lower joint surface 48c at the parts of the slant surface portions 47b, 48b become smaller, and surface pressures on the slant surface portions 47b, 48b by the pressing force in the pressing direction P become larger. Consequently, the surface pressures acting on the whole parts of the upper joint portion 47 and the lower joint portion 48 can be made uniform, and good welding can be achieved.

The structures of the front mounting stay 37 and the rear mounting stays 38L, 38R will be described below.

Figure 9:
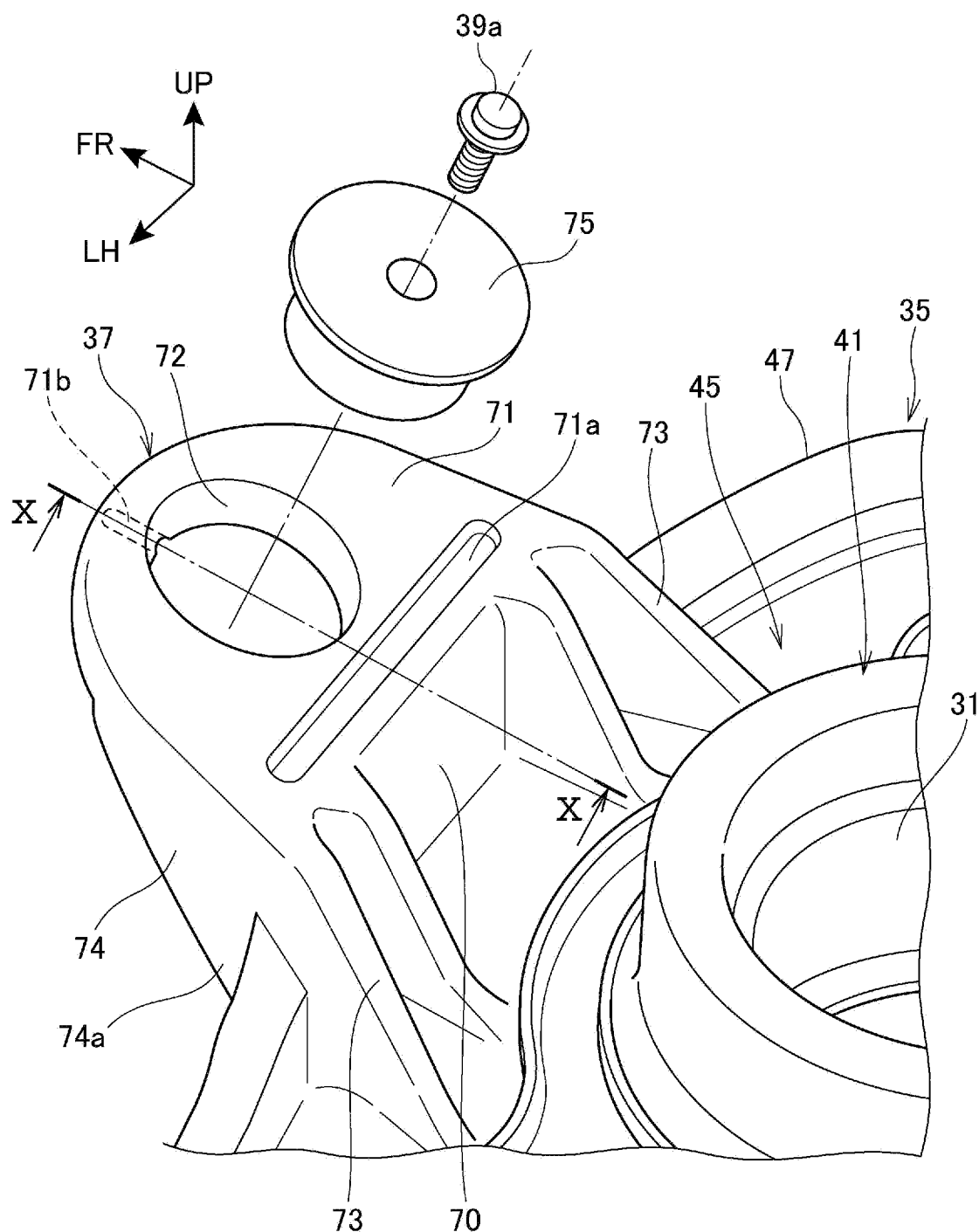
FIG. 9 is a perspective view of a front mounting stay, as viewed from a left upper side.
Figure 10:
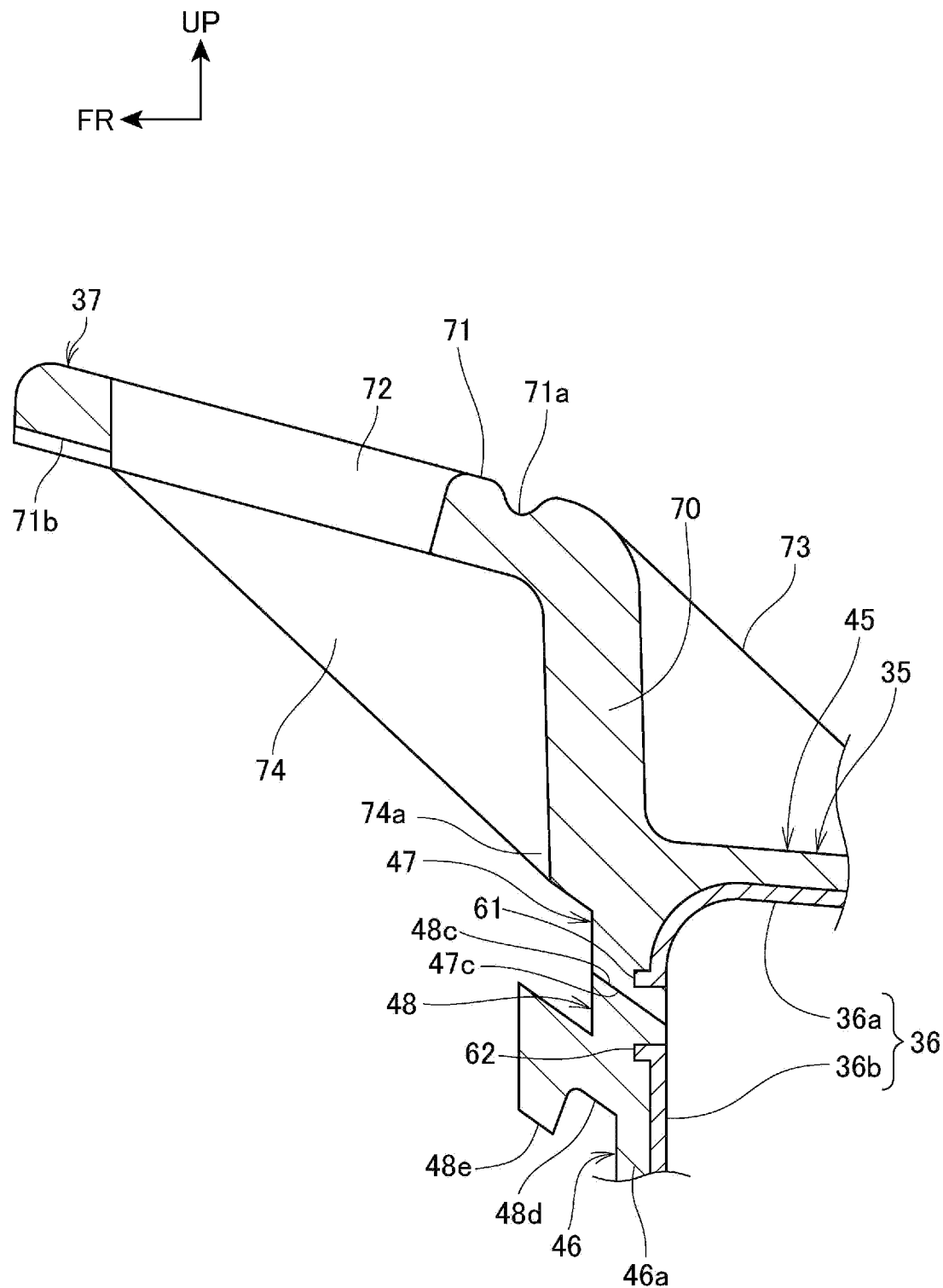
FIG. 10 is a sectional view taken along line X-X of FIG. 9.

FIG. 9 is a perspective view of the front mounting stay 37 as viewed from a left upper side. FIG. 10 is a sectional view taken along line X-X of FIG. 9.

Referring to FIGS. 9 and 10, the front mounting stay 37 is provided at a central portion, in regard of the width direction (vehicle width direction) of the fuel tank main body 35, of a front end portion of the upper half 45, and is located on the front side of the oil filler port 31.

The front mounting stay 37 includes a vertical wall portion 70 extending upward from a front edge of an upper surface of the upper half 45, a plate-shaped forward extension portion 71 extending forward from an upper end of the vertical wall portion 70, and a mounting hole 72 penetrating the forward extension portion 71 vertically in the plate thickness direction.

The vertical wall portion 70 is formed in a plate shape extending upward along the front edge of the upper surface of the upper half 45. A rear surface of the vertical wall portion 70 is connected to an upper surface of a front end portion of the upper half 45 by rear surface ribs 73, 73.

A pair of the rear surface ribs 73, 73 are provided at left and right side edge portions of the rear surface of the vertical wall portion 70. Rear edges of the rear surface ribs 73, 73 extend rearwardly downward toward the oil filler port 31 side.

The forward extension portion 71 extends forwardly upward. A lower surface of the forward extension portion 71 is connected to a front surface of the vertical wall portion 70 by reinforcement ribs 74, 74 (ribs). A pair of left and right reinforcement ribs 74, 74 extend downward from left and right side edges of the forward extension portion 71, and their rear ends are connected to left and right side edge portions of the front surface of the vertical wall portion 70. Front edges of the reinforcement ribs 74, 74 are inclined rearwardly downward in side view of the vehicle. Lower end portions 74a of the reinforcement ribs 74, 74 are connected to an upper portion of the flange-shaped upper joint portion 47. The reinforcement ribs 74, 74 extend from the upper joint portion 47 to a lower surface of the forward extension portion 71.

The mounting hole 72 is a round hole. The mounting hole 72 is provided in the forward extension portion 71 between the left and right reinforcement ribs 74, 74.

A cylindrical collar member 75 having a vibration-proofing property is fitted in the mounting hole 72, and the tank fixture 39a is inserted into and passed through a hole of the collar member 75. The tank fixture 39a is a bolt.

The tank fixture 39a fastens the front mounting stay 37 to the body frame F (see FIG. 1) through the collar member 75.

As depicted in FIG. 10, the vertical wall portion 70 of the front mounting stay 37 extends upward from an upper surface of the upper half 45 spaced upward from the upper joint surface 47c and the lower joint surface 48c. In other words, the front mounting stay 37 is provided to be integral with the upper half 45 at a position vertically spaced from the upper joint surface 47c and the lower joint surface 48c.

As a result, an external force transmitted to the upper half 45 through the front mounting stay 37 is not concentrated on the upper joint surface 47c or the lower joint surface 48c, but is dispersed to an upper surface portion of the upper half 45. Therefore, the influence of the external force on the barrier sheet layer 36 in the vicinity of the upper joint surface 47c and the lower joint surface 48c can be reduced, and the barrier sheet layer 36 can be protected effectively.

An upper surface of the forward extension portion 71 is provided, between the mounting hole 72 and the vertical wall portion 70, with an upper surface groove 71a extending in the width direction of the fuel tank main body 35.

In addition, a lower surface of the forward extension portion 71 is provided, between the mounting hole 72 and a front end of the forward extension portion 71, with a lower surface groove 71b extending in the longitudinal vehicle direction.

At the parts where the upper surface groove 71a and the lower surface groove 71b are provided, the plate thickness of the forward extension portion 71 is smaller, and the strength of the forward extension portion 71 is lower. In other words, the upper surface groove 71a and the lower surface groove 71b are brittle portions where the strength of the forward extension portion 71 is lowered. The strength of the forward extension portion 71 is lowered at the parts of the upper surface groove 71a and the lower surface groove 71b provided in the surroundings of the mounting hole 72.

In the case where an excessive external force acts on the front mounting stay 37, the front mounting stay 37 is precedingly broken in the peripheral portion of the upper surface groove 71a and the lower surface groove 71b, and part of the external force is absorbed in the front mounting stay 37. Therefore, the excessive external force can be restrained from being transmitted to the barrier sheet layer 36 through the front mounting stay 37, and the barrier sheet layer 36 can be protected.

Figure 11:
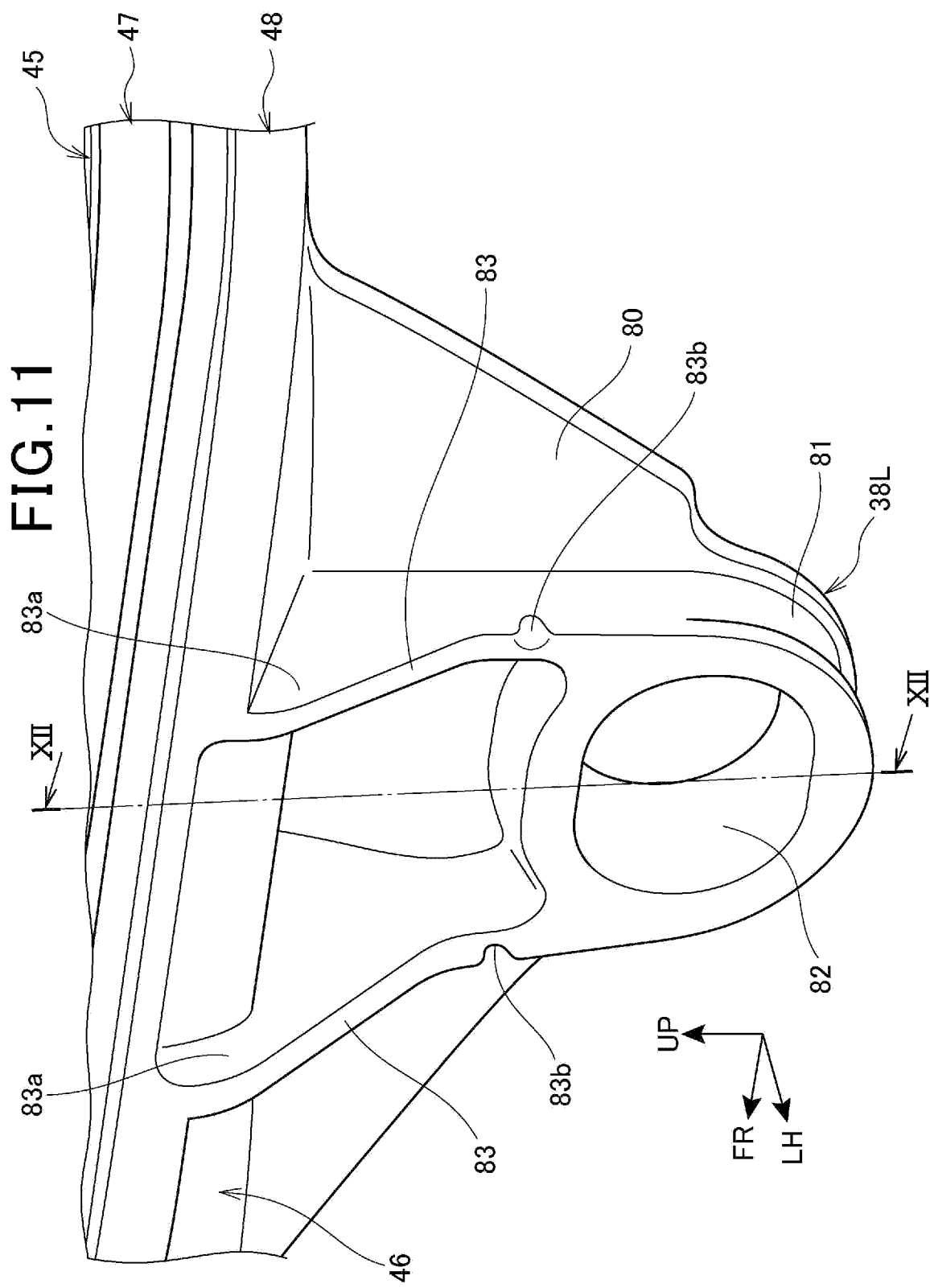
FIG. 11 is a perspective view of the rear mounting stay, as viewed from a left rear side.
Figure 12:
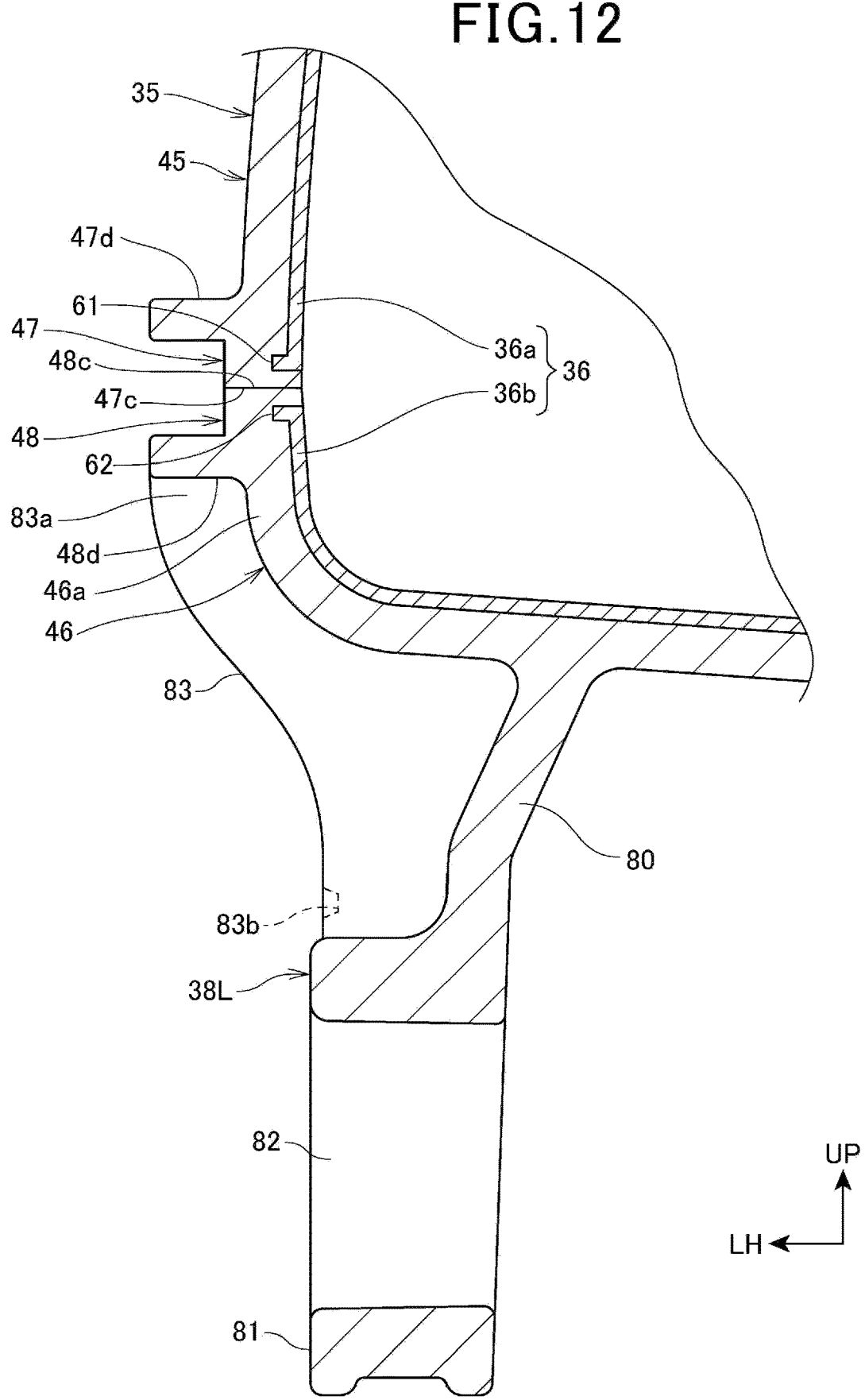
FIG. 12 is a sectional view taken along line XII-XII of FIG. 11.

FIG. 11 is a perspective view of the rear mounting stay 38L as viewed from a left rear side. FIG. 12 is a sectional view taken along line XII-XII of FIG. 11. Note that since the rear mounting stays 38L, 38R are provided in left-right symmetry, the rear mounting stay 38L will here be described in detail, and the description of the rear mounting stay 38R will be simplified.

Referring to FIGS. 11 and 12, the rear mounting stay 38L is provided at a left side edge portion of a rear portion of the lower half 46. Note that the rear mounting stay 38R is provided at a right side edge portion of the rear portion of the lower half 46.

The rear mounting stay 38L includes a side wall portion 80 extending downward from a side edge portion of a lower surface of the lower half 46, and a cylindrical portion 81 provided integrally at a lower end portion of the side wall portion 80.

The side wall portion 80 is formed in a plate shape oriented in the vehicle width direction of the motorcycle 1, and, in side view, it is formed in an inverted triangular shape tapered downward.

The cylindrical portion 81 is formed in a cylindrical shape projecting outward in regard of the vehicle width direction from a lower end portion of the side wall portion 80. The cylindrical portion 81 is provided in its center with a mounting hole 82 penetrating the rear mounting stay 38L in the vehicle width direction.

A pair of reinforcement ribs 83, 83 (ribs) vertically connecting an upper portion of the cylindrical portion 81 and a lower surface of the lower half 46 are provided at an outer surface of the side wall portion 80. The pair of reinforcement ribs 83, 83 are provided in the state of being spaced from each other in the longitudinal vehicle direction.

Parts of upper end portions 83a of the reinforcement ribs 83, 83 are connected to a lower portion of the flange-shaped lower joint portion 48. The reinforcement ribs 83, 83 extend from the lower joint portion 48 to the cylindrical portion 81.

Referring to FIGS. 1 and 11, a cylindrical collar member 84 having a vibration-proofing property is fitted in the mounting hole 82, and the tank fixture 39b is inserted in and passed through a hole of the collar member 84 from an outer side in regard of the vehicle width direction. The tank fixture 39*b* is a bolt.

The tank fixture 39*b* fastens the rear mounting stay 38L to the tank stays 15*a*, 15*a* through the collar member 84.

As depicted in FIG. 12, the side wall portion 80 of the rear mounting stay 38L extends downward from a lower surface of the lower half 46 spaced downward from the upper joint surface 47*c* and the lower joint surface 48*c*. In other words, the rear mounting stay 38L is provided to be integral with the lower half 46 at a position vertically spaced from the upper joint surface 47*c* and the lower joint surface 48*c*.

As a result, an external force transmitted to the lower half 46 through the rear mounting stay 38L is not concentrated on the upper joint surface 47*c* or the lower joint surface 48*c*, but is dispersed to a lower surface portion of the lower half 46. Therefore, the influence of the external force on the barrier sheet layers 36 in the vicinity of the upper joint surface 47*c* and the lower joint surface 48*c* can be reduced, and the barrier sheet layers 36 can be protected effectively.

Lower end portions of the reinforcement ribs 83, 83 are provided, in the vicinity of an outer periphery of the cylindrical portion 81, with grooves 83*b*, 83*b* recessed inward in regard of the vehicle width direction.

At the parts where the grooves 83*b*, 83*b* are provided, the plate thickness of the reinforcement ribs 83, 83 is smaller, and the strength of the rear mounting stay 38L is lower. In other words, the grooves 83*b*, 83*b* are brittle portions where the strength of the rear mounting stay 38L is lowered. The strength of the rear mounting stay 38L is lowered at the parts of the grooves 83*b*, 83*b* provided in the surroundings of the mounting hole 82.

In the case where an excessive external force acts on the rear mounting stay 38L, the rear mounting stay 38L is precedingly broken in the peripheral portion of the grooves 83*b*, 83*b*, and part of the external force is absorbed in the rear mounting stay 38L. Therefore, the excessive external force can be restrained from being transmitted to the barrier sheet layers 36 through the rear mounting stay 38L, and the barrier sheet layers 36 can be protected.

Referring to FIGS. 1 to 3, the front mounting stay 37 and the rear mounting stays 38L, 38R are disposed to be spaced apart in the longitudinal vehicle direction and in the vertical direction.

Specifically, the front mounting stay 37 is provided at an upper portion of a front end portion of the upper half 45, whereas the rear mounting stays 38L, 38R are provided at lower portions of rear portions of the lower half 46. In other words, the front mounting stay 37 and the rear mounting stays 38L, 38R are spaced apart in the longitudinal vehicle direction and in the vertical direction, and are provided divisionally in the upper half 45 and the lower half 46. As a result, external forces exerted on the fuel tank main body from the front mounting stay 37 and the rear mounting stays 38L, 38R can be dispersed to a wide range of the fuel tank main body. Therefore, concentration of stress on the barrier sheet layer 36 in the vicinity of the upper joint surface 47*c* and the lower joint surface 48*c* can be restrained, and the barrier sheet layer 36 can be protected effectively.

A mounting structure for the mouthpiece 41 will be described below.

Figure 13:
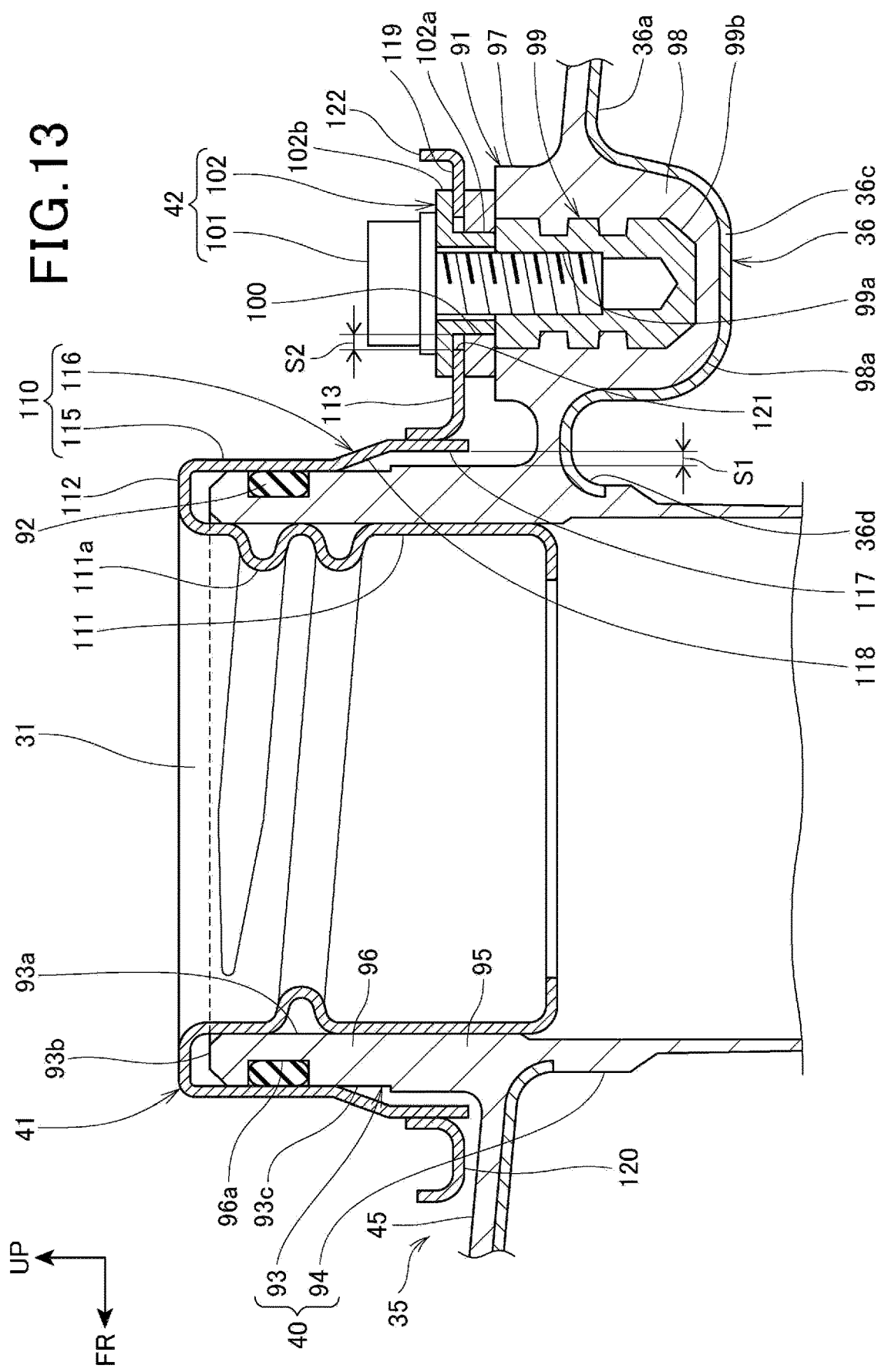
FIG. 13 is a sectional view taken along line XIII-XIII of FIG. 2.

FIG. 13 is a sectional view taken along line XIII-XIII of FIG. 2.

As depicted in FIG. 13, the mouthpiece 41 is mounted in engagement with the cylindrical injection section 40. In addition, the mouthpiece 41 is fixed to mouthpiece fixing sections 91 (fixing sections) provided at an upper surface of the fuel tank main body 35, by the mouthpiece fixtures 42. A seal member 92 is interposed between the mouthpiece 41 and the cylindrical injection section 40.

The cylindrical injection section 40 integrally includes a mouthpiece mounting cylinder portion 93 extending upward from an upper surface of the upper half 45, and a tank inner cylinder portion 94 extending to inside of the fuel tank main body 35.

The cylindrical injection section 40 is molded to be integral with the fuel tank main body 35 at the time of injection molding by the mold 53 of FIG. 5.

The mouthpiece mounting cylinder portion 93 includes a base end portion 95 extending upward from the upper surface of the upper half 45, and an upper portion 96 (a portion covered by a fitting portion) located above the base end portion 95. While the base end portion 95 and the upper portion 96 are provided coaxially, the outside diameter of the base end portion 95 is greater than the outside diameter of the upper portion 96.

An annular seal groove 96*a* recessed radially inward is provided in an outer peripheral portion of the upper portion 96 of the mouthpiece mounting cylinder portion 93.

An inner peripheral surface 93*a* of the mouthpiece mounting cylinder portion 93 has an equal diameter over its whole length.

A tip end surface 93*b* of the mouthpiece mounting cylinder portion 93 is flat. The tip end surface 93*b* is chamfered at an inner edge and an outer edge thereof.

An outer peripheral surface 93*c* of the mouthpiece mounting cylinder portion 93 is formed with a step at a vertically intermediate portion thereof, due to the difference in outside diameter between the base end portion 95 and the upper portion 96.

Figure 14:
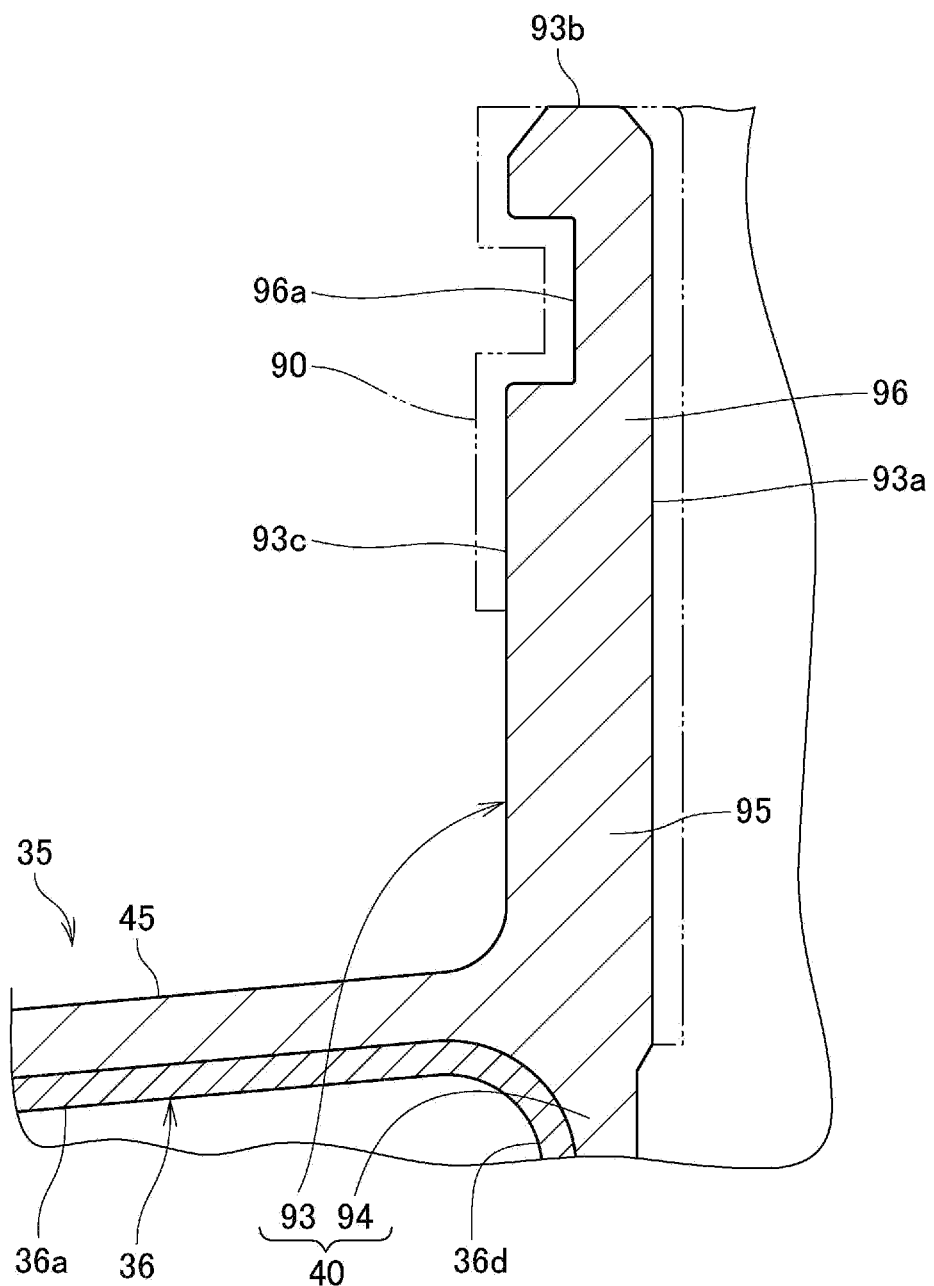
FIG. 14 is a sectional view for explaining processing of a mouthpiece mounting cylinder portion.

FIG. 14 is a sectional view for explaining processing of the mouthpiece mounting cylinder portion 93.

The mouthpiece mounting cylinder portion 93, after injection molding by the mold 53 of FIG. 5, is formed with a finished portion 90 depicted in FIG. 14, which is finished with high accuracy by machining. The machining is, for example, milling.

Specifically, the finished portion 90 includes the outer peripheral surface 93*c* of the upper portion 96 inclusive of the seal groove 96*a*, the tip end surface 93*b*, and the inner peripheral surface 93*a*.

The mouthpiece fixing section 91 includes an outer projecting portion 97 projecting upward from an upper surface of the upper half 45, and an inner projecting portion 98 (projecting portion) projecting to the inside of the fuel tank main body 35. The outer projecting portion 97 and the inner projecting portion 98 are portions where the resin constituting the fuel tank main body 35 is projecting.

In addition, the mouthpiece fixing section 91 includes a nut 99 embedded in the outer projecting portion 97 and the inner projecting portion 98.

Specifically, the mouthpiece fixing section 91 is provided with a hole 100 recessed downward from a flat upper surface of the outer projecting portion 97, and the nut 99 is embedded in a lower portion of the hole 100. A screw portion 99*a* of the nut 99 is exposed to the upper side from the hole 100. An outer peripheral portion of a lower end of the nut 99 is provided with a chamfer 99*b*.

Since the mouthpiece fixing section 91 is provided with the inner projecting portion 98, a large embedding length for the nut 99 can be secured, and the nut 99 can be firmly connected to the fuel tank main body 35.

A tip end surface 98a of the inner projecting portion 98 is formed in a hemispherical projection shape and is in a smooth curved surface shape.

Figure 15:
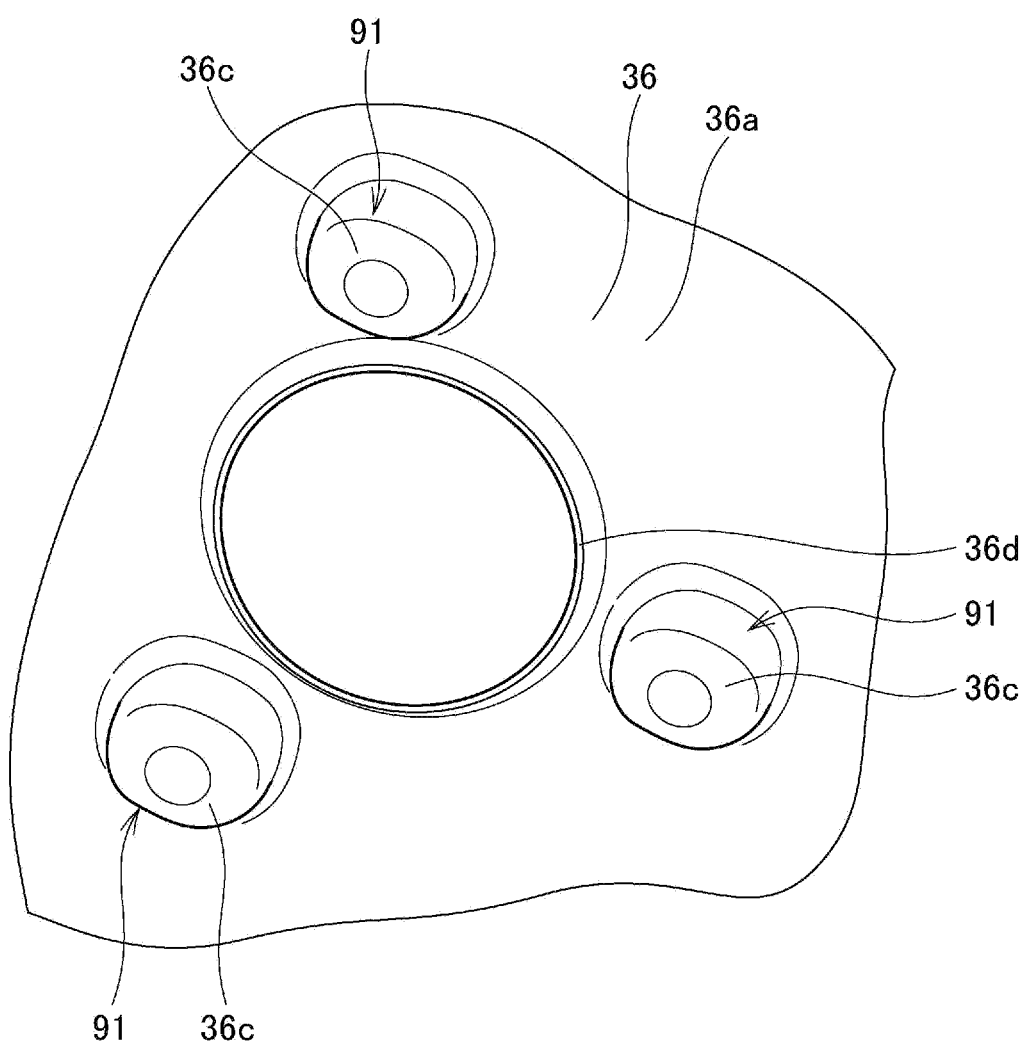
FIG. 15 is a view of a peripheral portion of inner projecting portions of mouthpiece fixing sections, as viewed from inside of the fuel tank main body.

FIG. 15 is a view of a peripheral portion of the inner projecting portions 98 of the mouthpiece fixing sections 91, as viewed from inside of the fuel tank main body 35.

Referring to FIGS. 2, 13 and 15, a plurality of the mouthpiece fixing sections 91 are concentrically provided around the cylindrical injection section 40 as a center, at substantially regular intervals.

The barrier sheet layers 36 are provided also on the inner projecting portions 98. The barrier sheet layers 36 provided on the inner projecting portions 98 are curved surface portions 36c which are in a smooth curved surface shape along the tip end surfaces 98a. Therefore, concentration of stress on the barrier sheet layers 36 provided on the inner projecting portions 98 can be prevented, and the barrier sheet layers 36 can be put in firm close contact with the inner surface of the fuel tank main body 35.

In addition, the barrier sheet layer 36 has, in the periphery of a base end portion of the tank inner cylinder portion 94, a bent-back portion 36d extending toward the inside of the fuel tank main body 35. The bent-back portion 36d is formed in an annular shape along an outer peripheral portion of the base end portion of the tank inner cylinder portion 94, and is connected to an outer peripheral portion of the tank inner cylinder portion 94.

The mouthpiece fixture 42 includes a mouthpiece fixing bolt 101 (bolt) fastened to the nut 99 in the mouthpiece fixing section 91, and a collar 102 in and through which a screw portion of the mouthpiece fixing bolt 101 is inserted and passed.

The collar 102 includes a cylinder portion 102a fitted to the hole 100 in the mouthpiece fixing section 91, and a flange portion 102b projecting from the cylinder portion 102a.

The mouthpiece 41 includes: a cylindrical skirt portion 110 covering the outer peripheral surface 93c of the mouthpiece mounting cylinder portion 93; an inner cylinder portion 111 fitted to the inner peripheral surface 93a of the mouthpiece mounting cylinder portion 93; an end surface portion 112 connecting an upper edge of the skirt portion 110 and an upper edge of the inner cylinder portion 111; and plate-shaped stay portions 113 extending from a lower end portion of the skirt portion 110 toward radially outer sides of the mouthpiece 41.

The skirt portion 110, the end surface portion 112, and the inner cylinder portion 111 are integrally provided by bending a metallic sheet. The stay portions 113 are joined to the skirt portion 110.

The mouthpiece 41 is made of metal, and is higher in strength than the cylindrical injection section 40. Therefore, at the time of fuel supply at a service station or the like, the cylindrical injection section 40 can be protected from a fuel service nozzle which is inserted into the oil filler port 31.

The inner cylinder portion 111 is provided at an inner peripheral portion thereof with a female screw portion 111a with which a screw portion at an outer periphery of the tank cap 32 (FIG. 1) is put into screw engagement. The inner cylinder portion 111 is provided over substantially the whole part of the inner peripheral surface 93a of the mouthpiece mounting cylinder portion 93.

The end surface portion 112 extends radially outward from an upper edge of the inner cylinder portion 111. The end surface portion 112 is formed in an annular shape coaxial with the cylindrical injection section 40, in axial view of the mouthpiece 41.

The end surface portion 112 covers the tip end surface 93b of the mouthpiece mounting cylinder portion 93 from above. A space is provided between the end surface portion 112 and the tip end surface 93b.

The skirt portion 110 is bent downward from an outer peripheral portion of the tip end surface 93b, and extends downward in parallel to the inner cylinder portion 111.

The skirt portion 110 includes a fitting portion 115 which fits to the part of an upper portion 96 of the outer peripheral surface 93c, and a large diameter portion 116 covering the part of the base end portion 95 of the outer peripheral surface 93c.

An inner peripheral surface of the fitting portion 115 makes close contact with the outer peripheral surface 93c of the upper portion 96. The seal member 92 is provided in the seal groove 96a in the upper portion 96. The seal member 92 is deformed under compression between the seal groove 96a and the fitting portion 115, to seal between the upper portion 96 and the skirt portion 110.

The large diameter portion 116 of the skirt portion 110 extends downward from the fitting portion 115 to the vicinity of the upper surface of the upper half 45. The large diameter portion 116 is formed to be greater in inside diameter and outside diameter than the fitting portion 115.

The large diameter portion 116 is provided to be larger in diameter than the fitting portion 115, in such a manner as to be spaced from the outer peripheral surface 93c of the mouthpiece mounting cylinder portion 93.

Specifically, the large diameter portion 116 includes a parallel portion 117 parallel to the fitting portion 115, and an enlarged diameter portion 118 gradually enlarged in diameter from the fitting portion 115 to the parallel portion 117.

The parallel portion 117 is provided in parallel to the base end portion 95 of the mouthpiece mounting cylinder portion 93, and covers the base end portion 95 from outside. A gap S1 is formed, in the radial direction, between the parallel portion 117 and the base end portion 95.

Referring to FIGS. 2 and 13, the stay portions 113 of the mouthpiece 41 include a plurality of mounting sections 119 extending radially outward from the outer peripheral portion of the large diameter portion 116 toward the mouthpiece fixing sections 91, and a connection section 120 circumferentially connecting the adjacent mounting sections 119, 119.

The fitting section 119 is provided with a fixing hole 121 in and through which the mouthpiece fixture 42 is inserted and passed. Specifically, the collar 102 of the mouthpiece fixture 42 is inserted in and passed through the fixing hole 121.

The fixing hole 121 is formed to be greater in outside diameter than the collar 102, such that the mouthpiece 41 can be moved by a predetermined distance in relation to the mouthpiece fixture 42. An adjustment gap S2 is formed between an inner periphery of the fixing hole 121 and an outer periphery of the collar 102.

In addition, the stay portion 113 has a peripheral edge rib 122 (rib) rising from a peripheral edge thereof. The peripheral edge rib 122 is provided over the whole circumference of the stay portion 113, along the fitting sections 119 and the connection section 120.

Here, an example of an assembling procedure for assembling the mouthpiece 41 into the fuel tank main body 35 will be described.

As depicted in FIG. 13, the mouthpiece 41 is inserted in the axial direction of the mouthpiece mounting cylinder portion 93 and mounted to the mouthpiece mounting cylinder portion 93, such that the mouthpiece mounting cylinder portion 93 is clamped between the skirt portion 110 and the inner cylinder portion 111.

The mouthpiece 41 is positioned in the axial direction of the mouthpiece mounting cylinder portion 93, with each fitting section 119 of the stay portion 113 put in contact with the upper surface of each mouthpiece fixing section 91.

The collar 102 is inserted in and passed through the fixing hole 121 in the stay portion 113 from above, and is set in the hole 100 in the mouthpiece fixing section 91. A lower end of the collar 102 makes contact with an upper surface of the nut 99.

When the mouthpiece fixing bolt 101 is fastened to the nut 99, a peripheral edge portion of the fixing hole 121 in the stay portion 113 is clamped between the flange portion 102b of the collar 102 and the upper surface of the mouthpiece fixing section 91. As a result, the mouthpiece 41 is fastened to the mouthpiece fixing sections 91 of the fuel tank main body 35 by the mouthpiece fixing bolts 101.

In the first embodiment, the mouthpiece 41 is fixed to the fuel tank main body 35 through being fastened by the mouthpiece fixing bolt 101 in a state of being inserted into the mouthpiece mounting cylinder portion 93. Therefore, in the case of detaching the mouthpiece 41 at the time of maintenance or the like, the mouthpiece fixing bolt 101 is detached, and the mouthpiece 41 is pulled out, whereby the mouthpiece 41 can be easily detached from the mouthpiece mounting cylinder portion 93. In addition, since the mouthpiece 41 is not caulked to the mouthpiece mounting cylinder portion 93, the detached mouthpiece 41 can be reused to be mounted to the mouthpiece mounting cylinder portion 93.

Figure 16:
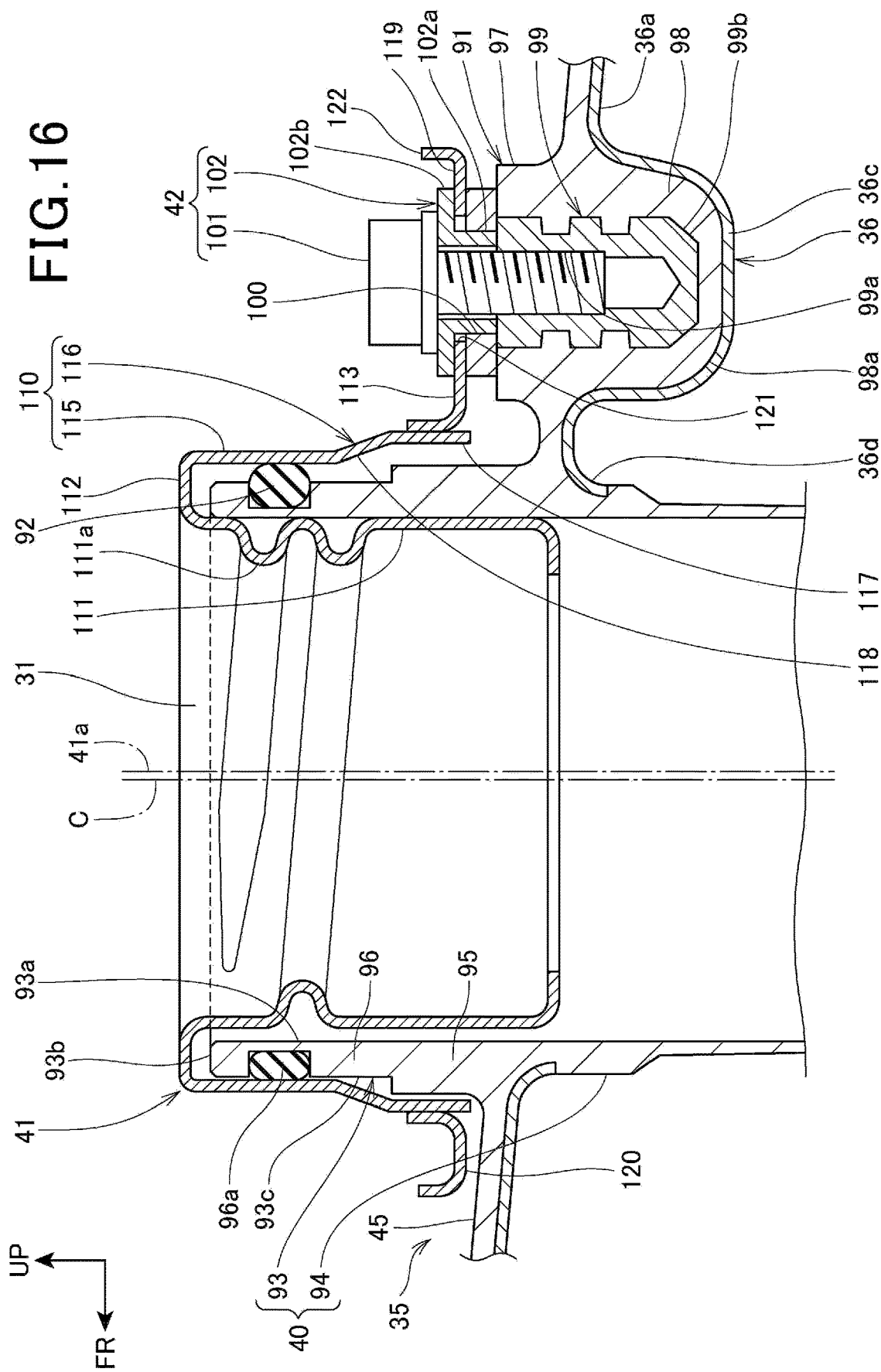
FIG. 16 is a sectional view depicting a mounted state of a mouthpiece in the case where a dimensional error is present.

FIG. 16 is a sectional view depicting a mounted state of the mouthpiece 41 in the case where a dimensional error exists.

For the mouthpiece mounting cylinder portion 93, a dimensional tolerance on a production basis is set. In FIG. 16, a case where the outside diameter of the upper portion 96 of the mouthpiece mounting cylinder portion 93 is a minimum of a dimensional tolerance and the inside diameter of the mouthpiece mounting cylinder portion 93 is a maximum of a dimensional tolerance is depicted as an example.

In the case where the actual size of the mouthpiece mounting cylinder portion 93 is deviated from a median of a tolerance, as in FIG. 16, the mouthpiece 41 can be assembled in a state in which its axis 41a is deviated, in a radial direction of the mouthpiece mounting cylinder portion 93, from an axis C passing through the center of the mouthpiece mounting cylinder portion 93.

In the present embodiment, the adjustment gap S2 (FIG. 13) is provided between the inner periphery of the fixing hole 121 of the mouthpiece 41 and the outer periphery of the collar 102 of the mouthpiece fixture 42, and the gap S1 (FIG. 13) is provided, in the radial direction, between the large diameter portion 116 and the base end portion 95. Here, the adjustment gap S2 and the gap S1 are comparable in size.

As a result, the mouthpiece 41 can be moved in the radial direction of the mouthpiece mounting cylinder portion 93 by an amount corresponding to the adjustment gap S2 and the gap S1, and can be fixed by the mouthpiece fixing bolt 101 in the thus moved state. Therefore, the mouthpiece 41 can be mounted to the mouthpiece mounting cylinder portion 93, while allowing a dimensional tolerance on a production basis of the mouthpiece mounting cylinder portion 93.

Here, the gap S1 is set in such a manner that the gap S1 would not be reduced to zero (0) even when the mouthpiece 41 is moved by the adjustment gap S2. In other words, the gap S1 is always formed between the large diameter portion 116 and the cylindrical injection section 40.

As has been described above, according to the first embodiment to which the present invention has been applied, the resin-made fuel tank 30 includes the resin-made fuel tank main body 35 provided by joining the upper half 45 and the lower half 46, and the barrier sheet layer 36 that is provided on the inner surface of the fuel tank main body 35 and that reduces permeation of the fuel from the fuel tank main body 35. End edges of the barrier sheet layers 36 are provided in the vicinity of the upper joint surface 47c and the lower joint surface 48c joined to each other as the upper half 45 and the lower half 46 are mated to each other. The end edges of the barrier sheet layers 36 have the bent portions 61, 62 bent toward the outside of the fuel tank main body 35. The bent portions 61, 62 are embedded in the fuel tank main body 35 at positions spaced from the upper joint surface 47c and the lower joint surface 48c.

According to this configuration, since the bent portions 61, 62 bent toward the outside of the fuel tank main body 35 are embedded in the fuel tank main body 35, the end edges of the barrier sheet layers 36 are firmly connected to the fuel tank main body 35, and are hardly influenced at the time of joining of the upper joint surface 47c and the lower joint surface 48c. Further, the bent portions 61, 62 are located at positions spaced from the upper joint surface 47c and the lower joint surface 48c, and are not joined at the upper joint surface 47c or the lower joint surface 48c. Consequently, at the time of joining the upper joint surface 47c and the lower joint surface 48c, it is unnecessary to control joining of the barrier sheet layers 36, and, accordingly, the resin-made fuel tank 30 can be easily manufactured.

In addition, the bent portions 61, 62 of the barrier sheet layers 36 extend in parallel to the upper joint surface 47c and the lower joint surface 48c, respectively, toward the outside of the fuel tank main body 35. According to this configuration, the planes of the bent portions 61, 62 are perpendicular to the joining direction of the upper joint surface 47c and the lower joint surface 48c, and, accordingly, a force generated at the time of joining the upper half 45 and the lower half 46 can be efficiently received.

Besides, the width W1 of the upper joint portion 47 provided with the upper joint surface 47 is greater than the thickness t1 of the side wall portion 45a of the fuel tank main body 35, and the width W2 of the lower joint portion 48 provided with the lower joint surface 48c is greater than the thickness t2 of the side wall portion 46a of the fuel tank main body 35. According to this configuration, the areas of the upper joint surface 47c and the lower joint surface 48c can be secured to be large, and, therefore, the joining strength of the upper joint surface 47c and the lower joint surface 48c can be enhanced.

Further, the upper joint portion 47 and the lower joint portion 48 are formed in a flange shape projecting to the outside of the fuel tank main body 35, the upper joint portion 47 and the lower joint portion 48 are provided with the pressing surfaces 47d, 48d which are pressed at the time of press bonding of the upper joint portion 47 and the lower joint portion 48, and the pressing surfaces 47d, 48d overlap with the upper joint surface 47c and the lower joint surface 48c in the pressing direction P. According to this configuration, at the part where the pressing surfaces 47d, 48d overlap respectively with the upper joint surface 47c and the lower joint surface 48c in the pressing direction P, the pressing force of the pressing surfaces 47d, 48d can be transmitted directly to the upper joint surface 47c and the lower joint surface 48c. Consequently, firm joining can be achieved.

In addition, the barrier sheet layers 36 include the upper barrier sheet layer 36a provided on the upper half 45 which is a divided body on one side, and the lower barrier sheet layer 36b provided on the lower half 46 which is the divided body on the other side; the bent portion 61 of the upper barrier sheet layer 36a and the bent portion 62 of the lower barrier sheet layer 36b are embedded in the fuel tank main body 35 in a mutually spaced apart state. According to this configuration, the bent portion 61 and the bent portion 62 are not joined to each other at the upper joint surface 47c or the lower joint surface 48c. For this reason, at the time of joining the upper joint surface 47c and the lower joint surface 48c, it is unnecessary to control joining of the barrier sheet layers 36, and, accordingly, the fuel tank 30 can be manufactured easily.

Besides, the barrier sheet layer 36 has a configuration in which the outer layers 57a, 57b, which are layers of high-density polyethylene, are adhered to both surfaces of the barrier layer 55, which is a layer of an ethylene-vinyl alcohol copolymer, through the adhesive layers 56, 56. The barrier sheet layer 36 is joined to the inner surface of the fuel tank main body 35 made of high-density polyethylene, through the outer layer 57a. According to this configuration, of the barrier sheet layer 36, the outer layer 57a which is the high-density polyethylene layer is joined to the inner surface of the fuel tank main body 35 made of the high-density polyethylene, namely, the same material as that of the outer layer 57a. For this reason, the barrier sheet layer 36 can be firmly joined to the inner surface of the fuel tank main body 35.

In addition, the cut surfaces 61a, 62a trimmed in the thickness direction by the cutting edge are formed at the tip ends of the bent portions 61, 62. Therefore, the dimensional accuracy of the bent portions 61, 62 can be enhanced, and the bent portions 61, 62 can be appropriately embedded in the fuel tank main body 35.

Besides, the upper joint surface 47c and the lower joint surface 48c include the flat surface portions 47a, 48a perpendicular to the press bonding direction (pressing direction P) of the upper joint surface 47c and the lower joint surface 48c, and the slant surface portions 47b, 48b slanted relative to the flat surface portions 47a, 48a. The upper joint portion 47 and the lower joint portion 48 provided with the upper joint surface 47c and the lower joint surface 48c at end surfaces thereof are formed in a flange shape projecting to the outside of the fuel tank main body 35. The upper joint portion 47 and the lower joint portion 48 are provided with the pressing surfaces 47d, 48d which are pressed at the time of press bonding of the upper joint surface 47c and the lower joint surface 48c. The width W3 of the upper joint portion 47 and the lower joint portion 48 at the slant surface portions 47b, 48b is smaller than the widths W1, W2 of the upper joint portion 47 and the lower joint portion 48 at the flat surface portions 47a, 48a.

According to this configuration, it is ensured that, even though the slant surface portions 47b, 48b receive a press bonding force smaller than that received by the flat surface portions 47a, 48a perpendicular to the press bonding direction (pressing direction P) at the time of press bonding, the surface pressure on the slant surface portions 47b, 48b will be sufficiently high, since the width W3 of the slant surface portions 47b, 48b is smaller than the widths W1, W2 of the flat surface portions 47a, 48a. Therefore, the good joining of the whole of the upper joint surface 47c and the lower joint surface 48c is achieved.

In addition, according to the first embodiment to which the present invention has been applied, the resin-made fuel tank 30 includes the resin-made fuel tank main body 35 provided by joining the upper half 45 and the lower half 46, the barrier sheet layers 36 that are provided on the inner surface of the fuel tank main body 35 and reduce permeation of the fuel from the fuel tank main body 35, and the front mounting stay 37 and the rear mounting stays 38L, 38R by which the fuel tank main body 35 is mounted to the vehicle body. The front mounting stay 37 and the rear mounting stays 38L, 38R are provided on the fuel tank main body 35 at positions vertically spaced from the upper joint surface 47c and the lower joint surface 48c which are joined to each other as the upper half 45 and the lower half 46 are mated to each other.

According to this configuration, since the front mounting stay 37 and the rear mounting stays 38L, 38R are provided on the fuel tank main body 35 at positions vertically spaced from the upper joint surface 47c and the lower joint surface 48c of the upper half 45 and the lower half 46, external forces from the front mounting stay 37 and the rear mounting stays 38L, 38R can be restrained from influencing the barrier sheet layers 36 in the vicinity of the upper joint surface 47c and the lower joint surface 48c. Consequently, the barrier sheet layers 36 can be effectively protected against the external forces.

Besides, the front mounting stay 37 and the rear mounting stays 38L, 38R are mutually spaced apart in the vertical direction and in the longitudinal vehicle direction. According to this configuration, external forces acting on the fuel tank main body 35 from the plurality of front mounting stay 37 and rear mounting stays 38L, 38R can be dispersed to a wide range of the fuel tank main body 35. Therefore, the barrier sheet layers 36 can be effectively protected against the external forces.

In addition, the front mounting stay 37 and the rear mounting stays 38L, 38R are divisionally provided in the upper half 45 and the lower half 46. According to this configuration, external forces exerted on the fuel tank main body 35 from the front mounting stay 37 and the rear mounting stays 38L, 38R are dispersed to the upper half 45 and the lower half 46. For this reason, the barrier sheet layers 36 can be effectively protected against the external forces.

Further, the mounting stays include the front mounting stay 37 provided at a front portion of the fuel tank main body 35, and the rear mounting stays 38L, 38R provided at rear portions of the fuel tank main body 35. The front mounting stay 37 is provided at a central portion in the left-right direction of the upper half 45, whereas the pair of the rear mounting stays 38L, 38R are provided at left and right portions of the lower half 46. According to this configuration, external forces are dispersed in the longitudinal vehicle direction from the front mounting stay 37 at the front portion of the fuel tank main body 35 and the rear mounting stays 38L, 38R at the rear portions of the fuel tank main body 35, and are dispersed to the upper half 45 and the lower half 46, in acting on the upper joint surface 47c and the lower joint surface 48c. For this reason, the barrier sheet layers 36 can be effectively protected. In addition, since a three-point support by the front mounting stay 37 and the left and right rear mounting stays 38L, 38R is realized, the fuel tank main body 35 can be firmly mounted effectively with a minimum configuration.

In addition, the front mounting stay 37 is provided with the mounting hole 72 in and through which the tank fixture 39a fixed to the body frame F is inserted and passed. The front mounting stay 37 is provided with the upper surface groove 71a and the lower surface groove 71b as brittle portions in the vicinity of the mounting hole 72. Besides, the rear mounting stays 38L, 38R are provided with the mounting holes 82 in and through which the tank fixtures 39b fixed to the body frame F are inserted and passed. The rear mounting stays 38L, 38R are provided with the grooves 83b, 83b as brittle portions in the vicinity of the mounting holes 82. According to this configuration, in the case where an excessive external force is exerted, the upper surface groove 71a, the lower surface groove 71b and the grooves 83b, 83b of the front mounting stay 37 and the left and right rear mounting stays 38L, 38R located at positions spaced from the upper joint surface 47c and the lower joint surface 48c are broken precedingly to the upper joint surface 47c and the lower joint surface 48c. Therefore, the barrier sheet layers 36 in the fuel tank main body 35 can be protected.

Besides, the brittle portions are the upper surface groove 71a, the lower surface groove 71b and the grooves 83b, 83b which are provided in the surroundings of the mounting holes 72, 82. According to this configuration, the brittle portions can be compactly provided at positions remote from the upper joint surface 47c and the lower joint surface 48c, and the external forces exerted on the upper joint surface 47c and the lower joint surface 48c from the front mounting stay 37 and the left and right rear mounting stays 38L, 38R are reduced; therefore, the barrier sheet layers 36 can be protected.

In addition, the upper joint surface 47c is provided on the upper joint portion 47 which is a flange portion extending toward the outside of the fuel tank main body 35, and the front mounting stay 37 is provided with the reinforcement ribs 74 extending from the upper joint portion 47. According to this configuration, the strength and rigidity of the front mounting stay 37 can be enhanced by the upper joint portion 47 and the reinforcement ribs 74. Therefore, the fuel tank main body 35 can be firmly supported by the front mounting stay 37.

Besides, the lower joint surface 48c is provided on the lower joint portion 48 which is a flange portion extending toward the outside of the fuel tank main body 35. The rear mounting stays 38L, 38R are provided with the reinforcement ribs 83, 83 extending from the lower joint portion 48. According to this configuration, the strength and rigidity of the rear mounting stays 38L, 38R can be enhanced by the lower joint portion 48 and the reinforcement ribs 83, 83. Therefore, the fuel tank main body 35 can be firmly supported by the rear mounting stays 38L, 38R.

Further, according to the first embodiment to which the present invention has been applied, the resin-made fuel tank 30 includes the resin-made fuel tank main body 35, the resin-made cylindrical injection section 40 for liquid injection that is provided on the fuel tank main body 35, and the mouthpiece 41 that engages with the cylindrical injection section 40 and covers the inner peripheral surface 93a, the tip end surface 93b and the outer peripheral surface 93c of the cylindrical injection section 40. The fuel tank main body 35 is provided with the mouthpiece fixing sections 91 to which the mouthpiece fixtures 42 for fixing the mouthpiece 41 to the fuel tank main body 35 are fixed. The mouthpiece 41 has the annular skirt portion 110 covering the outer peripheral surface 93c. The skirt portion 110 is provided at an upper portion thereof with the fitting portion 115 fitted to the upper portion 96 of the outer peripheral surface 93c, and is provided at a lower portion thereof with the large diameter portion 116 larger in diameter than the fitting portion 115. The mouthpiece 41 has the stay portions 113 extending toward the radially outer side of the mouthpiece 41 from the large diameter portion 116, and is provided in the stay portions 113 with the fixing holes 121 in and through which the mouthpiece fixtures 42 are inserted and passed.

According to this configuration, the mouthpiece 41 engaged with the cylindrical injection section 40 is fixed to the mouthpiece fixing sections 91 of the fuel tank main body 35 by the mouthpiece fixtures 42 inserted in and passed through the fixing holes 121 in the stay portions 113 extending from the large diameter portion 116; therefore, by mounting and detaching the mouthpiece fixtures 42, the mouthpiece 41 can be easily mounted to and detached from the cylindrical injection section 40. Further, the mouthpiece 41 has the large diameter portion 116 larger in diameter than the fitting portion 115, and can be moved integrally with the stay portions 113 by an amount of the gap S1 between the large diameter portion 116 and the outer peripheral surface 93c of the cylindrical injection section 40. This ensures that even if there is a dimensional error on a projection basis of the cylindrical injection section 40, the error can be absorbed by movement of the mouthpiece 41. Accordingly, the mouthpiece 41 can be mounted and detached, while allowing a dimensional error on a production basis of the cylindrical injection section 40.

In addition, the fixing hole 121 is larger in diameter than the mouthpiece fixture 42, such that the mouthpiece 41 can be moved by a predetermined distance in the radial direction of the cylindrical injection section 40 in relation to the cylindrical injection section 40. According to this configuration, the mouthpiece 41 can be moved in the radial direction of the cylindrical injection section 40 by an amount by which the fixing hole 121 can be moved relative to the mouthpiece fixture 42. Therefore, the mouthpiece 41 can be mounted and detached, while allowing a dimensional error on a production basis of the cylindrical injection section 40.

Besides, the barrier sheet layer 36 that reduces permeation of the fuel reserved in the fuel tank main body 35 is provided on the inner surface of the fuel tank main body 35, and the mouthpiece fixing section 91 is the nut 99 embedded in the surface of the fuel tank main body 35. The mouthpiece fixture 42 is a mouthpiece fixing bolt 101 put into screw engagement with the nut 99, the nut 99 is embedded in the inner projecting portion 98 projecting toward the inside of the fuel tank main body 35, and the tip end surface 98a of the inner projecting portion 98 is in a hemispherical projection shape. According to this configuration, since the tip end surface 98a of the inner projecting portion 98 is in the hemispherical projection shape, concentration of stress on the barrier sheet layer 36 provided on the tip end surface 98a of the inner projecting portion 98 can be prevented, and the degree of freedom in layout of the mouthpiece fixing sections 91 can be enhanced.

Further, a plurality of the mouthpiece fixing sections 91 are provided concentrically around the cylindrical injection section 40 as a center, at substantially regular intervals. According to this configuration, external forces acting on the mouthpiece fixing sections 91 are dispersed effectively, and, therefore, concentration of stress in the surroundings of the cylindrical injection section 40 can be suppressed.

In addition, the mouthpiece 41 is provided with the peripheral edge ribs 122 rising from peripheral edges of the stay portions 113, and the peripheral edge ribs 122 are continuous over the parts between the fixing holes 121 provided in plurality in the surroundings of the skirt portion 110. As a result, the strength and rigidity of the mouthpiece 41 can be enhanced, and the cylindrical injection section 40 can be effectively protected by the mouthpiece 41.

Besides, the large diameter portion 116 includes the parallel portion 117 parallel to the fitting portion 115, and the enlarged diameter portion 116 gradually enlarged in diameter from the fitting portion 115 to the parallel portion 117. According to this configuration, it is easy to control the gap S1 between the parallel portion 117 and the outer peripheral surface 93c of the cylindrical injection section 40. In addition, the rigidity of the skirt portion 110 can be enhanced by the enlarge diameter portion 116, and the cylindrical injection section 40 can be effectively protected by the mouthpiece 41.

Besides, the cylindrical injection section 40 is provided with the finished portion 90 finished by machining, at that portion (upper portion 96) to which the fitting portion 115 of the mouthpiece 41 fits. According to this configuration, that portion of the cylindrical injection section 40 to which the fitting portion 115 of the mouthpiece 41 fits can be processed with high accuracy by machining. A dimensional error arising from the machining can be absorbed by movement of the mouthpiece 41.

In addition, the cylindrical injection section 40 has the base end portion 95 covered by the large diameter portion 116 of the mouthpiece 41, and the outside diameter of the base end portion 95 is greater than the outside diameter of that portion (upper portion 96) of the cylindrical injection section 40 which is covered by the fitting portion 115. According to this configuration, the base end portion 95 of the cylindrical injection section 40 can be made large in diameter correspondingly to the large diameter portion 116 of the mouthpiece 41, whereby the strength and rigidity of the cylindrical injection section 40 can be enhanced.

Besides, the seal member 92 is interposed between the fitting portion 115 of the mouthpiece 41 and the outer peripheral surface 93c of the cylindrical injection section 40. According to this configuration, in the case of absorbing a dimensional error by movement of the mouthpiece 41, hermetic sealing property between the fitting portion 115 and the outer peripheral surface 93c of the cylindrical injection section 40 can be secured by flexure of the seal member 92.

Second Embodiment

Figure 17:
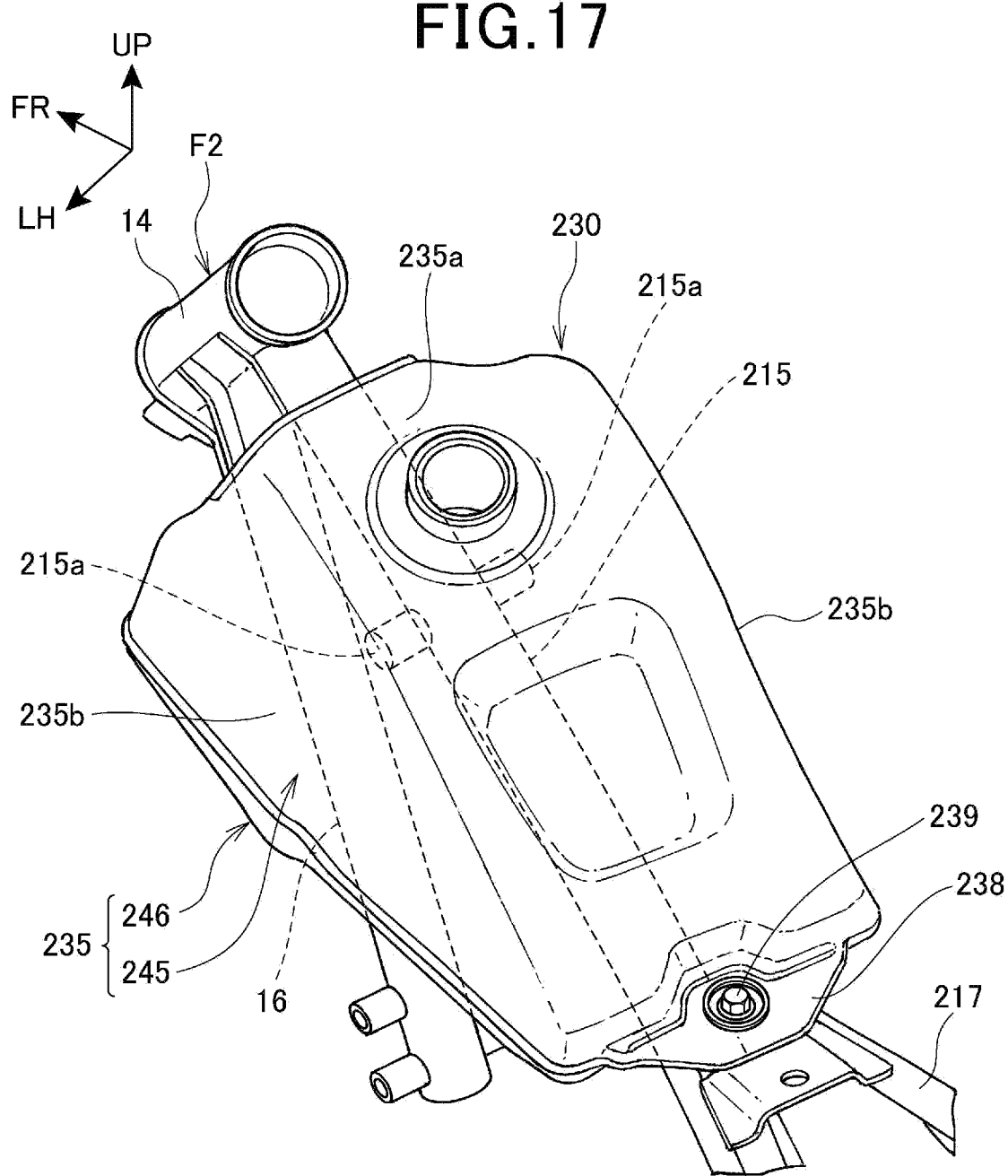
FIG. 17 is a perspective view, as viewed from a left upper side, of a mounting structure of a fuel tank in a second embodiment.
Figure 18:
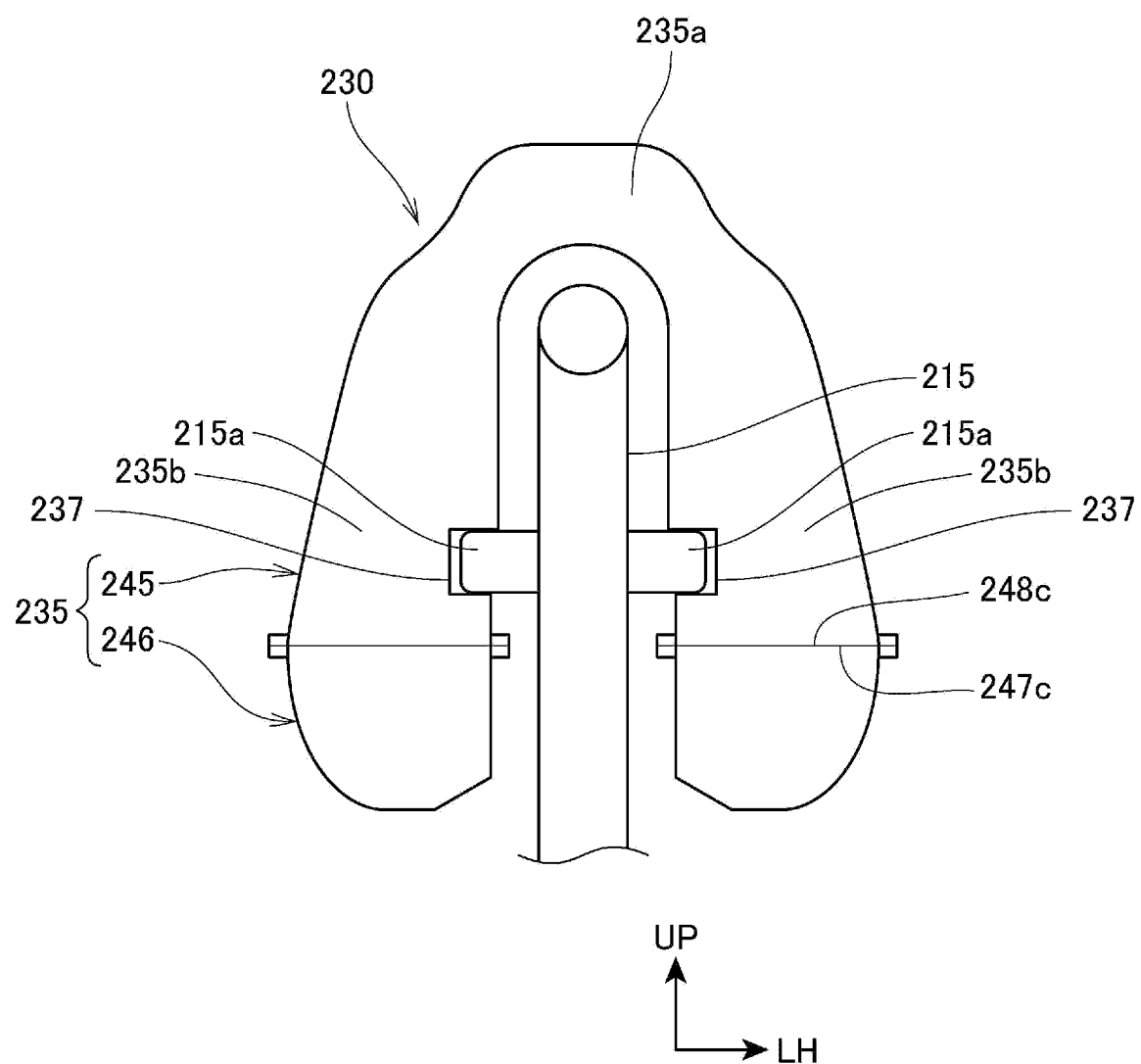
FIG. 18 is a schematic view of the mounting structure of the fuel tank, as viewed from the front side.

Referring to FIGS. 17 and 18, a second embodiment to which the present invention has been applied will be described below. In the second embodiment, the portions configured in the same manner as in the first embodiment above are denoted by the same reference symbols as used above, and descriptions thereof will be omitted.

The second embodiment differs from the first embodiment above in configuration of mounting stays, in accordance with a body frame F2.

FIG. 17 is a perspective view, as viewed from a left upper side, of a mounting structure of a fuel tank 230 in the second embodiment. FIG. 18 is a schematic view of the mounting structure of the fuel tank 230, as viewed from the front side.

A motorcycle 201 includes the body frame F2 and the fuel tank 230. While other parts of the motorcycle 201 are not depicted in FIG. 17, the motorcycle 201 is configured in the same manner as the motorcycle 1.

The body frame F2 includes a head pipe section 14, a single main frame 215 extending rearwardly downward from the head pipe section 14, a down frame 16, and a seat frame 217 extending rearward from the main frame 215.

The main frame 215 is provided at its side surfaces with tank support sections 215a, 215a projecting to the left and right sides.

The fuel tank 230 includes a fuel tank main body 235 and a barrier sheet layer 36 (see FIG. 3).

The fuel tank main body 235 is disposed such as to straddle the main frame 215 in the left-right direction on the upper side of the main frame 215, and is supported by the main frame 215.

The fuel tank main body 235 includes an upper portion 235a disposed on the upper side of the main frame 215, and a pair of left and right side portions 235b, 235b extending downward from the upper portion 235a while passing on the left and right sides of the main frame 215.

The fuel tank main body 235 is formed in a tank shape by joining an upper half 245 and a lower half 246 to each other at joint surfaces 247c, 248c.

Inside surfaces of the side portions 235b, 235b of the upper half 245 are provided with front mounting stays 237, 237 (mounting stays) to which the tank support portions 215a, 215a are fitted. A front portion of the fuel tank main body 235 is mounted to the tank support portions 215a, 215a.

The front mounting stays 237, 237 are spaced upward from the joint surfaces 247c, 248c.

Therefore, external forces from the front mounting stays 237, 237 can be restrained from influencing the barrier sheet layer 36 in the vicinity of the joint surfaces 247c, 248c. Therefore, the barrier sheet layer 36 can be effectively protected against the external forces.

The upper half 245 is provided with a rear mounting stay 238 extending rearward from a rear end portion thereof. A rear portion of the fuel tank main body 235 is fixed to the body frame F2 by a tank fixture 239 inserted in and passed through the rear mounting stay 238 from above.

Note that the above-described embodiment depicts a mode of application of the present invention, and the present invention is not limited to the above embodiment.

While the upper half 45 and the lower half 46 have been mentioned as an example in describing the divided bodies constituting the fuel tank main body 35 in the above embodiment, the present invention is not limited to this, and the fuel tank main body 35 may be divided into three or more divided bodies. For example, the lower half 46 may be joined to an upper half composed of two divided bodies, to form a fuel tank main body.

While the motorcycle 1 has been mentioned as an example in describing the saddle riding vehicle in the above embodiment, the present invention is not limited to this. The resin-made fuel tank of the present invention is applicable to all saddle riding vehicles such as three-wheeled saddle riding vehicle including two front wheels or including two rear wheels, and saddle riding vehicles including four or more wheels. In addition, the present invention may be applied to resin-made fuel tanks other than those for vehicle use.

Third Embodiment

Referring to FIGS. 19 to 26, a third embodiment to which the present invention has been applied will be described below. In the third embodiment, the portions configured in the same manner as in the first embodiment above are denoted by the same reference symbols as used above, and descriptions thereof will be omitted.

Hitherto, there has been known a resin-made tank formed by injection molding which includes a joint portion where divided bodies consisting of an upper tank and a lower tank of the tank are joined by welding, and a flange portion of the joint portion is integrally molded with a holding member extending outward (see, for example, Patent Document 2 (Japanese Patent Laid-Open No. 2005-199884)). In addition, in Patent Document 2, the resin-made tank is formed in two layers (multiple layers) such that the resin of the tank main body and the resin provided on the inside of the tank main body differ from each other in function.

Besides, it is also known that in the case of forming the resin-made tank in two layers, the resin-made tank is produced by blow molding.

Meanwhile, in the conventional resin-made tank mentioned above, the holding member is provided at the flange portion of the joint portion between the divided bodies of the tank, and it is desired that an exterior part can be provided on the resin-made tank with a higher degree of freedom by further making the most of an outer surface of the resin-made tank. In addition, in the case where a barrier layer (barrier sheet layer) for preventing permeation of a fuel or the like is provided as an inner layer of the resin-made tank configured in multiple layers, it is desired to provide the barrier layer as uniformly as possible.

A case of forming a resin-made tank in two layers by blow molding will be described referring to FIG. 26.

Figure 26:
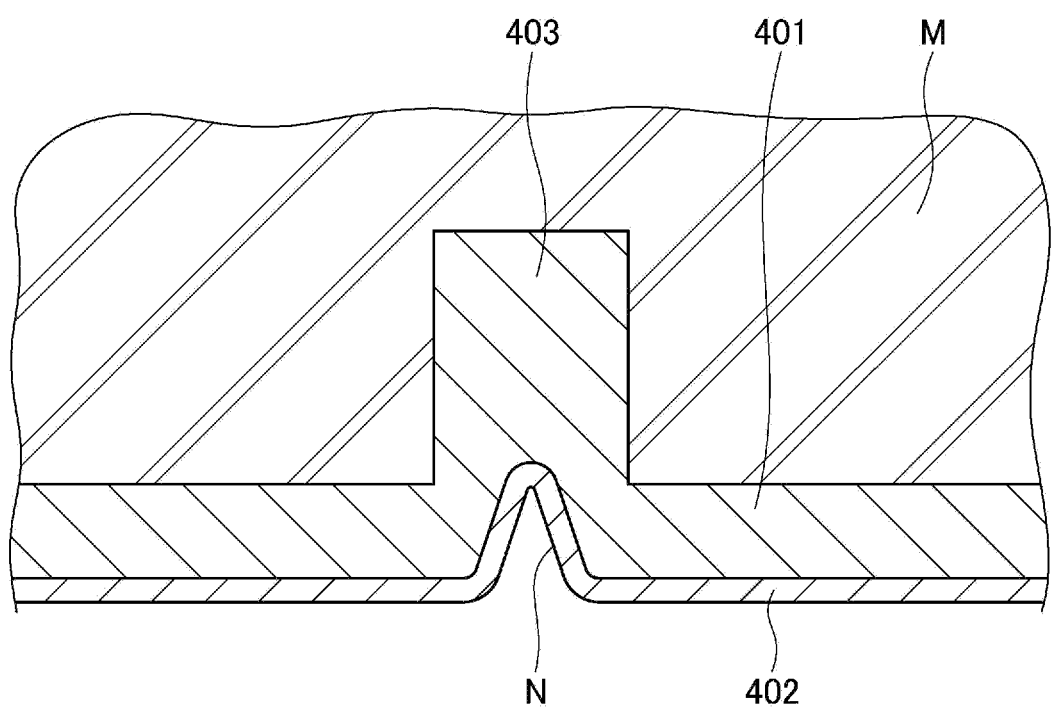
FIG. 26 is a sectional view of a resin-made tank formed by blow molding in Comparative Example.

In the blow molding in FIG. 26, a resin 401 of a surface layer and a resin 402 (for example, a barrier layer) of an inner layer are provided in a mold M for blow molding. The resin 401 of the surface layer and the resin 402 of the inner layer are expanded by air injected to the inside of the resin 401 of the surface layer and the resin 402 of the inner layer, whereby the resin-made tank is molded in a shape along the inner surface of the mold M. Here, in the case where a molded part 403 such as a holding member projecting outward is molded to be integral with the resin 401 of the surface layer by blow molding, the resin 401 of the surface layer is recessed to the outer side at a position corresponding to the molded part 403, so that a notch N recessed to the outer side is generated also in the resin 402 of the inner layer. Therefore, at the part of the notch N, the resin 402 of the inner layer may be partially thinner, or a wrinkle is generated in the resin 402 of the inner layer.

Accordingly, it is desired, in a resin-made tank for a saddle riding vehicle, to provide an exterior part on the resin-made tank with a high degree of freedom and to provide a barrier layer uniformly.

Figure 19:
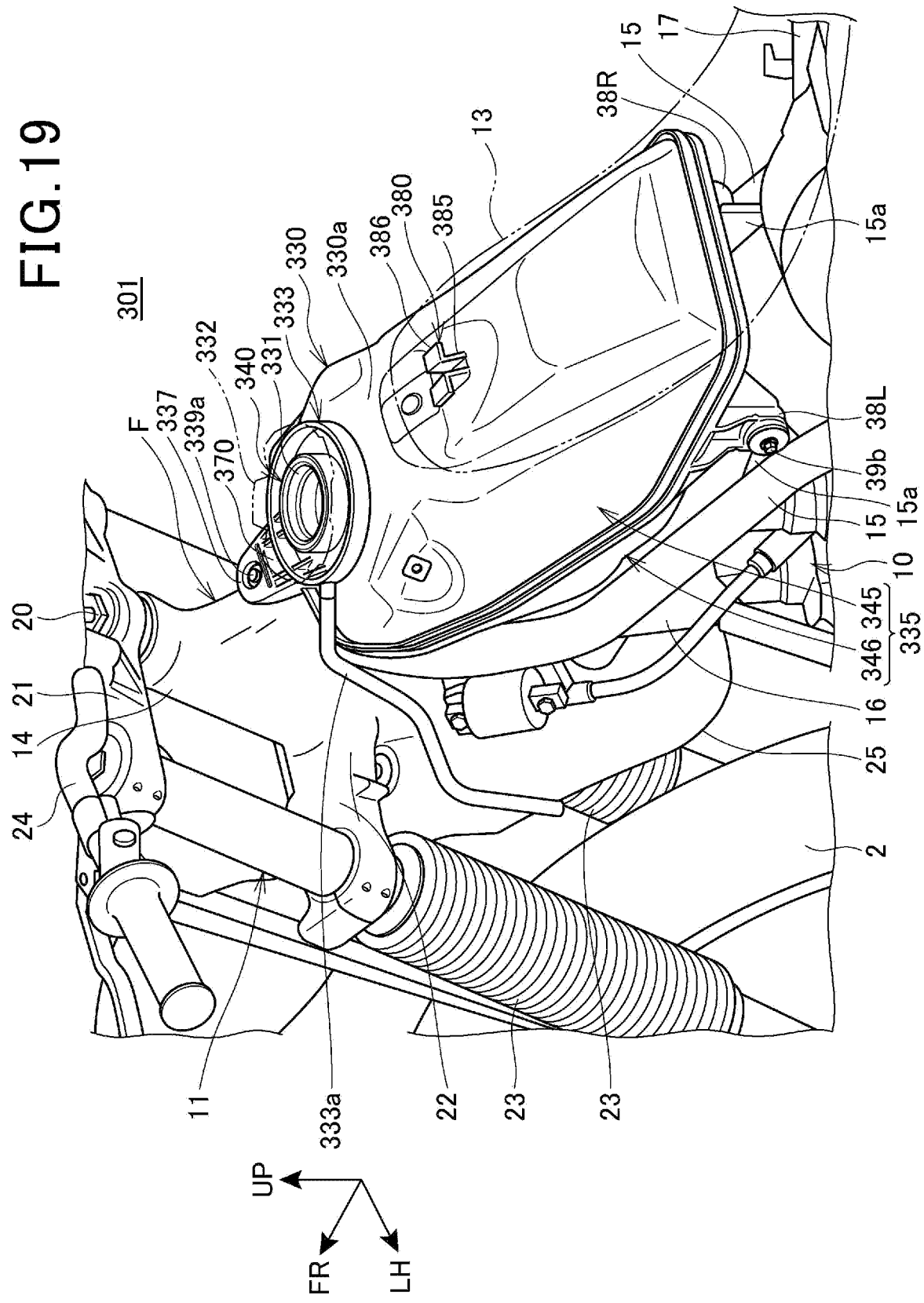
FIG. 19 is a perspective view, as viewed from a left rear side, of a front portion of a motorcycle according to a third embodiment.

FIG. 19 is a perspective view, as viewed from a left rear side, of a front portion of a motorcycle according to the third embodiment.

The motorcycle 301 has a fuel tank 330 (resin-made fuel tank) in place of the fuel tank 30 in the first embodiment described above.

The fuel tank 330 is disposed on the upper side of main frames 15, 15 so as to lie along the main frames 15, 15, and is supported by the main frames 15, 15. The fuel tank 330 is disposed between a head pipe section 14 and a seat 13, in a longitudinal vehicle direction. A front end portion of the seat 13 covers a rear portion of an upper surface 330a (outer surface) of the fuel tank 330, from above.

Figure 20:
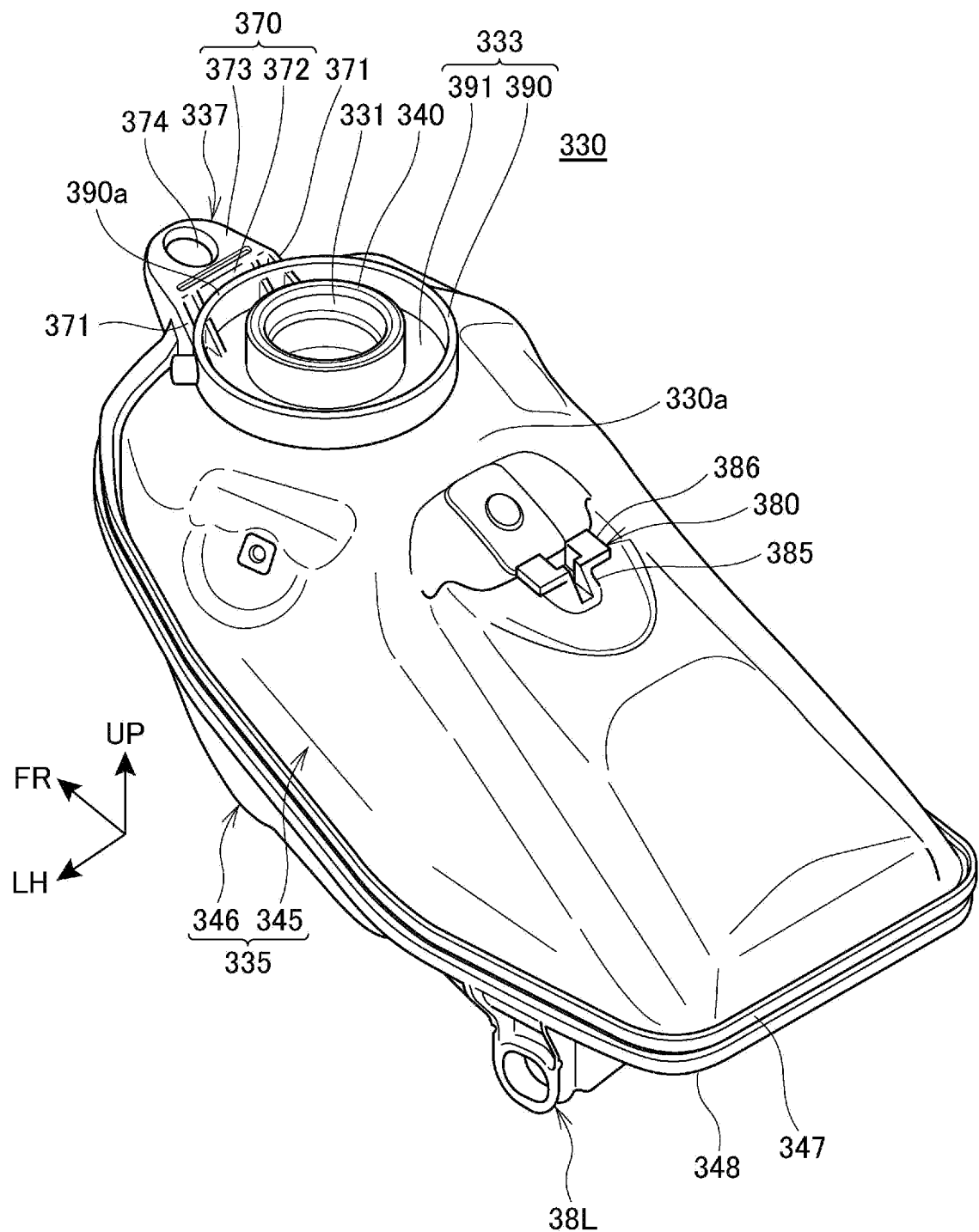
FIG. 20 is a perspective view of the fuel tank as viewed from a left upper side.

FIG. 20 is a perspective view of the fuel tank 330 as viewed from a left upper side.

As depicted in FIGS. 19 and 20, an oil filler port 331 as an injection port for a fuel (liquid) is provided at a front portion of the upper surface 330a of the fuel tank 330. A tank cap 332 is attached to the oil filler port 331, and the oil filler port 331 is closed with the tank cap 332.

The fuel tank 330 is provided with a tray 333 (exterior part) that surrounds the oil filler port 331 from the surroundings. The tray 333 is provided between the tank cap 332 and the upper surface 330a of the fuel tank 330.

The tray 333 is provided with a drain pipe 333a extending downward. The fuel (liquid) spilling at the time of oil supply or the like is received by the tray 333, and is discharged downward through the drain pipe 333a.

The fuel tank 330 is provided, at the upper surface 330a thereof on the rear side of the oil filler port 331, with a seat engagement section 380 (exterior part) for engagement with a front end portion of the seat 13.

Figure 21:
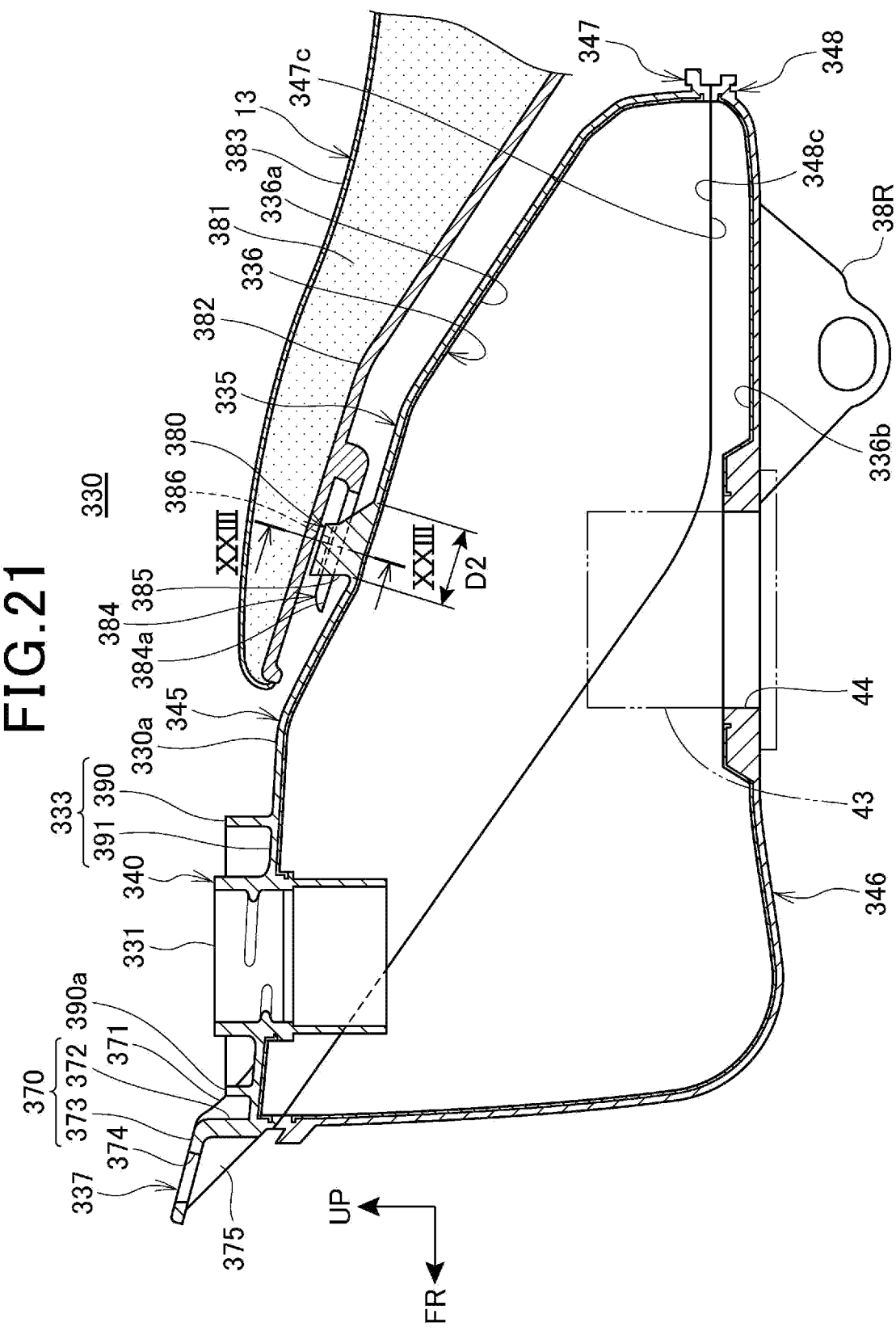
FIG. 21 is a sectional view of the fuel tank, taken at the center of the vehicle width.
Figure 22:
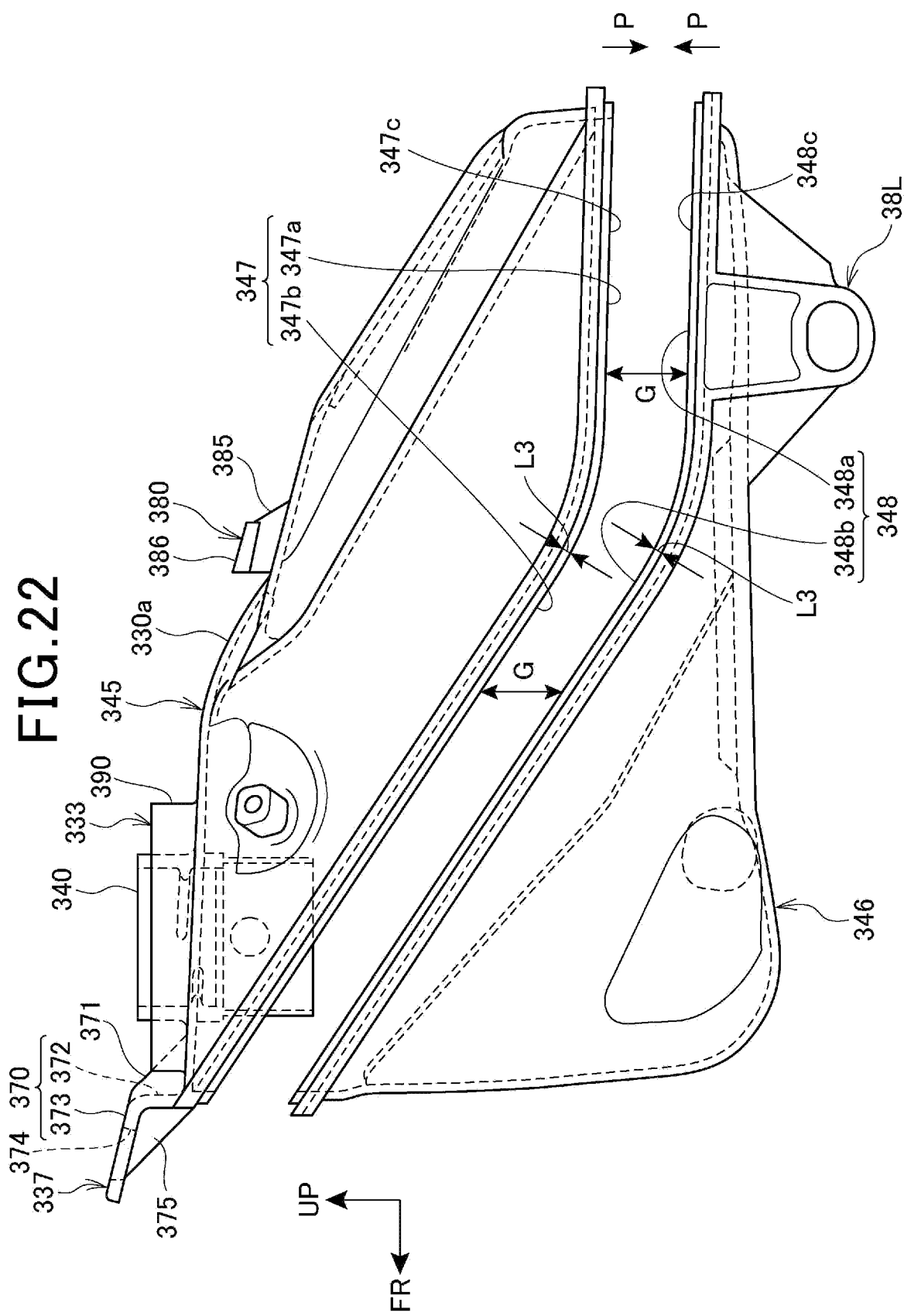
FIG. 22 is a left side view depicting a state in which the fuel tank is divided.

FIG. 21 is a sectional view of the fuel tank 330, taken at the center of the vehicle width. FIG. 22 is a left side view depicting a state in which the fuel tank 330 is divided.

Referring to FIGS. 20 to 22, the fuel tank 330 includes a resin-made fuel tank main body 335 (tank main body), and a barrier layer 336 (barrier sheet layer) provided over substantially the whole part of the inner surface of the fuel tank main body 335. The thickness of the barrier layer 336 is substantially constant over the whole part of the barrier layer 336.

The barrier layer 336 is formed from a material lower in permeability of the fuel than the material constituting the fuel tank main body 335. The barrier layer 336 restrains the fuel such as gasoline reserved in the fuel tank 330 from permeating the fuel tank 330 to leak to the exterior.

A front mounting stay 337 (mounting stay) projecting forward is provided at an upper portion of a front portion of the fuel tank main body 335.

The front portion of the fuel tank main body 335 is fixed to an upper surface of a rear portion of the head pipe section 14, by a tank fixture 339a (fixture, see FIG. 19) which is inserted in and passed through the front mounting stay 337 from above.

A pair of left and right rear mounting stays 38L, 38R projecting downward are provided at lower portions of a rear portion of the fuel tank main body 335.

The main frames 15, 15 are provided at rear portions thereof with tank stays 15a, 15a (FIG. 1) extending upward.

Rear portions of the fuel tank main body 335 are fixed to the tank stays 15a, 15a, by tank fixtures 39b, 39b (see FIG. 1) which are inserted in and passed through the rear mounting stays 38L, 38R from outer sides in regard of the vehicle width direction.

The fuel tank main body 335 is provided at an upper portion of a front portion thereof with a cylindrical injection section 340 (injection port) for fuel injection (liquid injection). The cylindrical injection section 340 is a cylinder extending in the vertical direction, and an upper end portion of the cylindrical injection section 340 forms the oil filler port 331.

The cylindrical injection section 340 is formed from the same resin material as the resin material constituting the fuel tank main body 335, and is formed to be integral with the fuel tank main body 335.

A metallic mouthpiece (not depicted) for covering an outer periphery and an inner periphery of the cylindrical injection section 340 is mounted to the cylindrical injection section 340.

In addition, the fuel tank main body 335 is provided at a lower surface thereof with a pump mounting opening 44 to which to mount a fuel pump 43.

The fuel tank main body 335 is divided into an upper half 345 (divided body, a divided body on one side) constituting an upper portion of the fuel tank main body 335, and a lower half 346 (divided body, a divided body on the other side)

constituting a lower portion of the fuel tank main body 335. The fuel tank main body 335 is formed in a tank shape by joining the upper half 345 and the lower half 346 to each other.

The upper half 345 is formed in a case shape which is opening at the lower surface to the lower side. A peripheral edge portion of the opening on the lower surface of the upper half 345 is an upper joint portion 347 which is joined to the lower half 346. In side view of the vehicle, the upper joint portion 347 includes a flat surface portion 347a extending substantially horizontally at a rear portion, and a slant surface portion 347b extending forwardly upward at an inclination relative to the flat surface portion 347a.

The front mounting stay 337 is provided at a front end portion of the upper half 345. The cylindrical injection section 340 is provided at a front portion of the upper surface 330a of the upper half 345. Here, the upper surface 330a of the upper half 345 is the upper surface 330a of the fuel tank 330.

The lower half 346 is formed in a case shape which is opening at the upper surface to the upper side. A peripheral edge portion of the opening on the upper surface of the lower half 346 is a lower joint portion 348 which is joined to the upper half 345. In side view of the vehicle, the lower joint portion 348 includes a flat surface portion 348a parallel to the flat surface portion 347a, and a slant surface portion 348b parallel to the slant surface portion 347b. The flat surface portion 347a is joined to the flat surface portion 348a, and the slant surface portion 347b is joined to the slant surface portion 348b.

The rear mounting stays 38L, 38R are provided at rear portions of the lower half 346. The pump mounting opening 44 is provided at the lower surface of the lower half 346.

Specifically, the upper half 345 and the lower half 346 are united together by welding at a part where an upper joint surface 347c (joint surface) composed of a lower surface of the upper joint portion 347 of the upper half 345 and a lower joint surface 348c (joint surface) composed of an upper surface of the lower joint portion 348 of the lower half 346 are mated to each other.

The barrier layer 336 includes an upper barrier layer 336a (a barrier layer on one side; an upper barrier sheet layer) which is bonded to the inner surface of the upper half 345, and a lower barrier layer 336b (a barrier layer on the other side; a lower barrier sheet layer) which is bonded to the inner surface of the lower half 346.

Manufacturing steps of the fuel tank main body 335 are the same as the steps depicted in FIG. 5 in the first embodiment described above. In the third embodiment, the fuel tank main body 35, the barrier sheet layer 36, the upper half 45, the lower half 46, the upper barrier sheet layer 36a, the lower barrier sheet layer 36b, the upper joint surface 47c, and the lower joint surface 48c, in FIG. 5, should be read as the fuel tank main body 335, the barrier layer 336 (barrier sheet layer), the upper half 345, the lower half 346, the upper barrier layer 336a (upper barrier sheet layer), the lower barrier layer 336b (lower barrier sheet layer), the upper joint surface 347c, and the lower joint surface 348c, respectively.

Specifically, a plurality of materials for constituting the barrier layer 336 are supplied to the extrusion die 51, and a sheet-shaped molded body 50 is extruded from the die 51.

The molded body 50 is shaped into a shape along the inner surface of the fuel tank main body 335 by the vacuum forming machine 52, and is solidified, to be a shaped body 50a. The barrier layer 336 as the shaped body 50a is subjected to trimming of a peripheral edge portion by a trimming die (not depicted).

The shaped body 50a thus trimmed is set in the injection mold 53 for molding the fuel tank main body 335, and is integrated with the fuel tank main body 335 at the time of injection molding of the fuel tank main body 335. Thus, the barrier layer 336 is bonded to the inner surface of the fuel tank main body 335 by insert molding. In other words, the fuel tank main body 335 is molded on the shaped body 50a by injection molding.

Here, the upper barrier layer 336a and the lower barrier layer 336b are molded separately.

The upper barrier layer 336a is bonded to the upper half 345 at the time of injection molding of the upper half 345, and the lower barrier layer 336b is bonded to the lower half 346 at the time of injection molding of the lower half 346.

Thereafter, the upper joint surface 347c and the lower joint surface 348c (FIG. 22) are melted by heating, and the upper joint surface 347c and the lower joint surface 348c are press bonded to each other, whereby the upper half 345 and the lower half 346 are united together.

Figure 23:
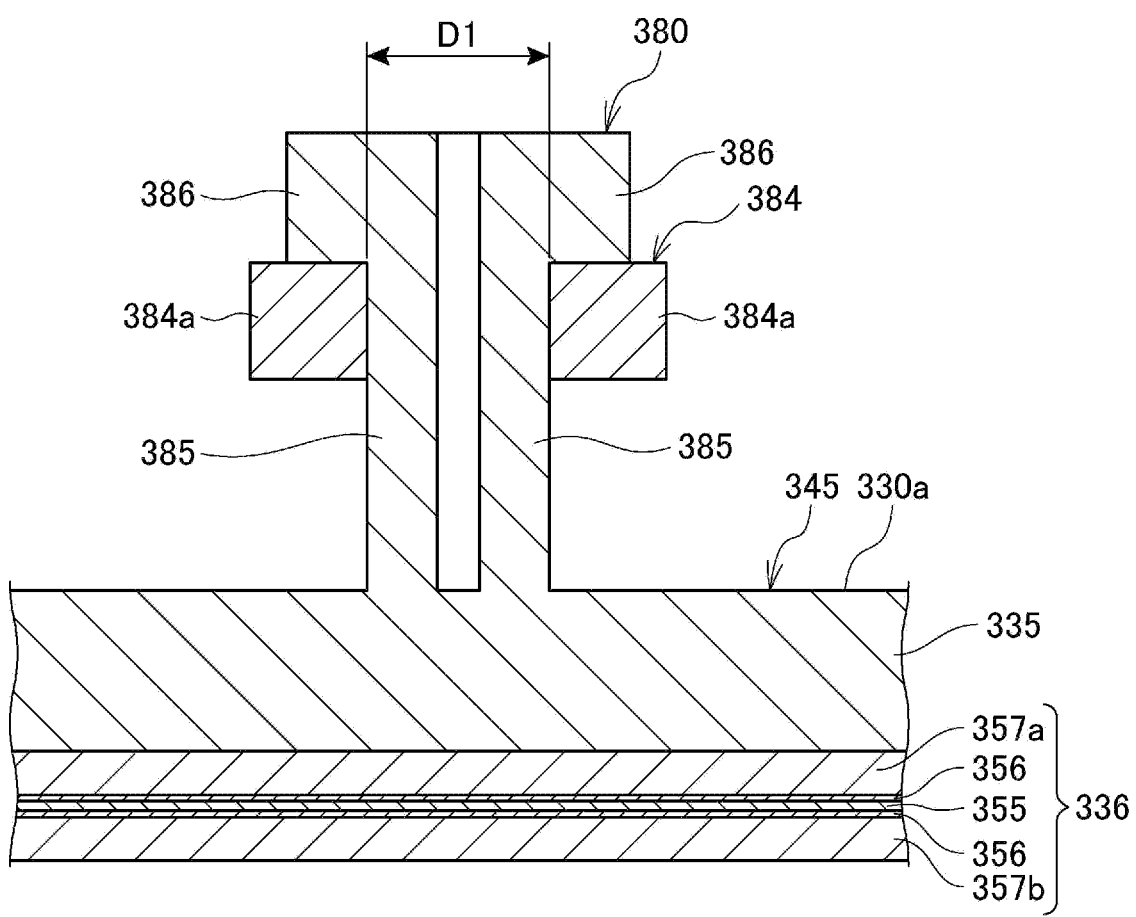
FIG. 23 is a sectional view taken along line XXIII-XXIII of FIG. 21.

FIG. 23 is a sectional view taken along line XXIII-XXIII of FIG. 21.

The material and layer configurations of the fuel tank 330 are the same as in FIG. 6 in the first embodiment described above. Specifically, the barrier layer 336 (barrier sheet layer), a barrier layer main body 355 (barrier layer), adhesive layers 356, 356, and outer layers 357a, 357b in FIG. 23 correspond respectively to the barrier sheet layer 36, the barrier layer 55, the adhesive layers 56, 56, and the outer layers 57a, 57b in FIG. 6, but they are denoted by reference symbols different from those used in FIG. 6, for convenience of explanation.

The structure at the part where the upper half 345 and the lower half 346 are joined to each other is the same as in FIGS. 7 and 8 in the first embodiment described above, and, therefore, detailed description thereof is omitted here.

The structure of the part where the upper half 345 and the lower half 346 are joined to each other may be understood by a process in which the fuel tank main body 35, the upper half 45, the lower half 46, the upper barrier sheet layer 36a, the lower barrier sheet layer 36b, the bent portion 61, the bent portion 62, the upper joint portion 47, the lower joint portion 48, the upper joint surface 47c, and the lower joint surface 48c, in FIGS. 7 and 8, should be read as the fuel tank main body 335, the upper half 345, the lower half 346, the upper barrier layer 336a (upper barrier sheet layer), the lower barrier layer 336b (lower barrier sheet layer), a bent portion 361, a bent portion 362, the upper joint portion 347, the lower joint portion 348, the upper joint surface 347c, and the lower joint surface 348c, respectively.

The structure of the front mounting stay 337 will be described below.

Figure 24:
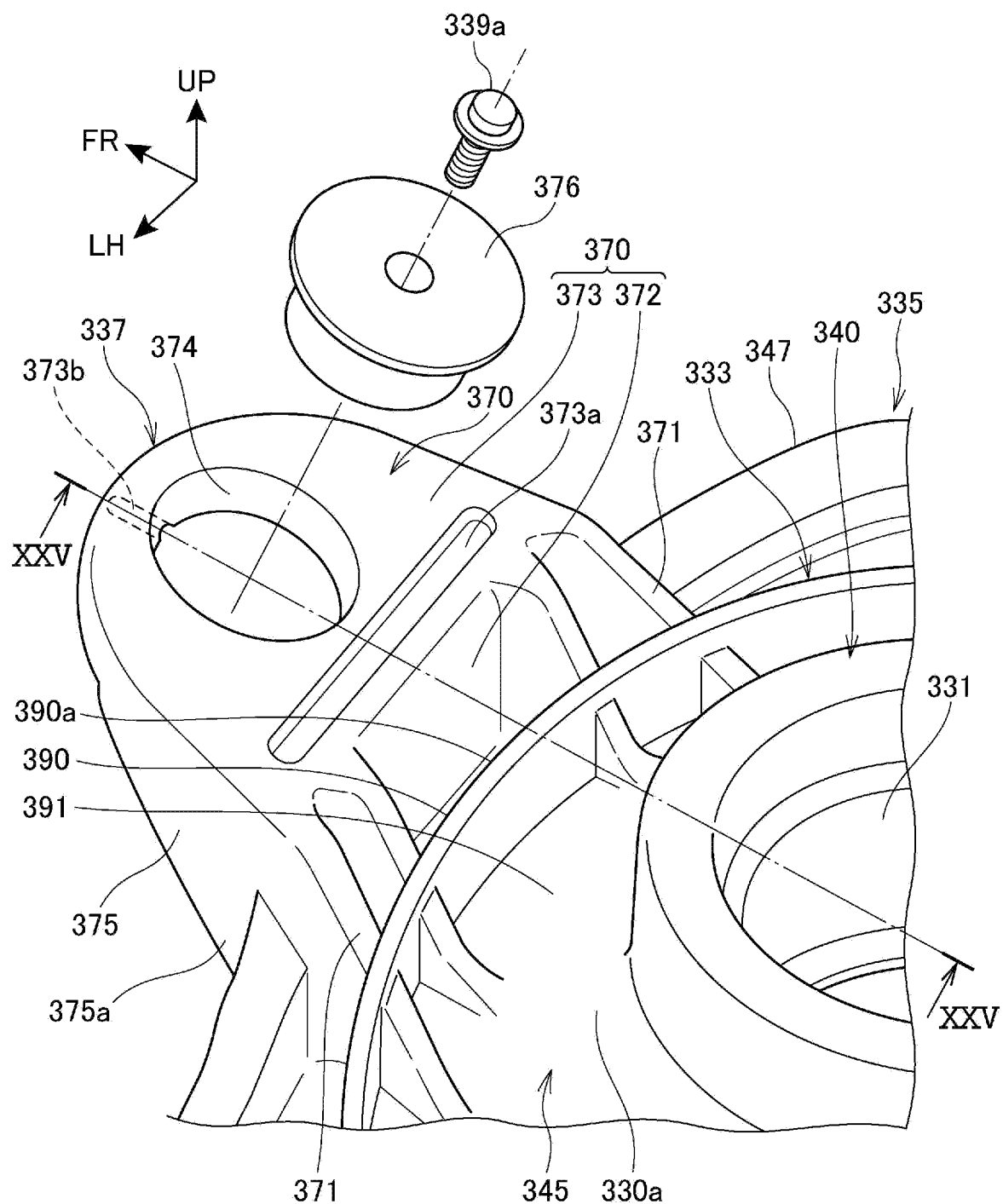
FIG. 24 is a perspective view of a front mounting stay, as viewed from a left upper side.
Figure 25:
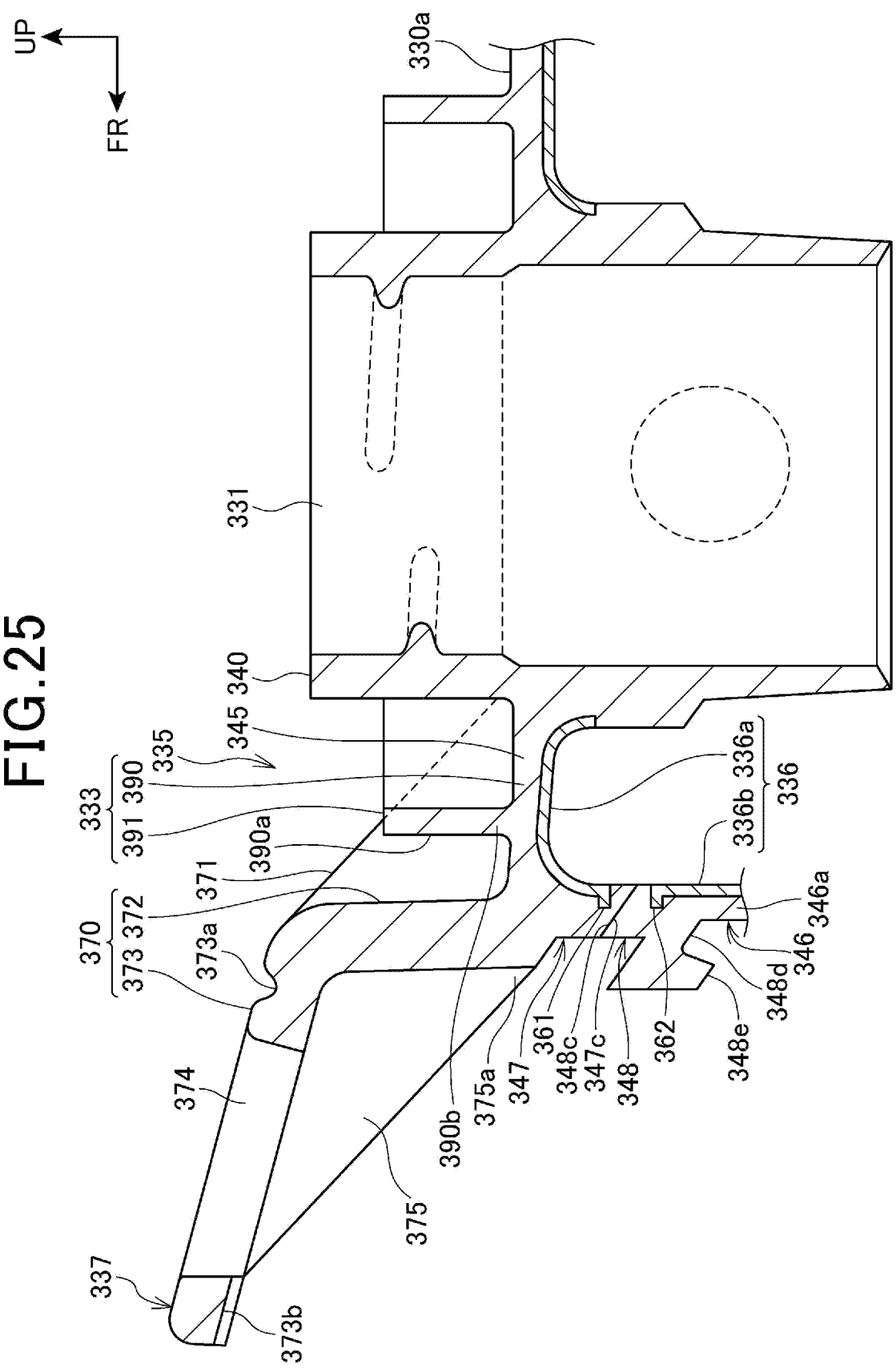
FIG. 25 is a sectional view taken along line XXV-XXV of FIG. 24.

FIG. 24 is a perspective view of the front mounting stay 337 as viewed from a left upper side. FIG. 25 is a sectional view taken along line XXV-XXV of FIG. 24.

Referring to FIGS. 24 and 25, the front mounting stay 337 is provided on a front end portion of the upper half 345, at a central portion in the width direction of the fuel tank main body 335 (vehicle width direction), and is located on the front side of the oil filler port 331.

The front mounting stay 337 integrally includes a stay main body section 370 provided at the upper surface 330a of the upper half 345, and reinforcement ribs 371, 371 provided at a rear surface of the stay main body section 370.

The stay main body section 370 includes a vertical wall portion 372 extending upward from a front edge of the upper surface 330a of the upper half 345, a plate-shaped forward extension portion 373 extending forward from an upper end of the vertical wall portion 372, and a mounting hole 374 vertically penetrating the forward extension portion 373 in a plate thickness direction.

The vertical wall portion 372 is formed in a plate shape extending upward along the front edge of the upper surface 330a of the upper half 345. A rear surface of the vertical wall portion 372 is connected to the upper surface 330a of the front end portion of the upper half 345 by the reinforcement ribs 371, 371.

A pair of the reinforcement ribs 371, 371 are provided at left and right side edge portions of the rear surface of the vertical wall portion 372. The reinforcement ribs 371, 371 are disposed between the stay main body section 370 and the oil filler port 331, and extend in the longitudinal vehicle direction. Rear edges of the reinforcement ribs 371, 371 are inclined rearwardly downward toward the oil filler port 331 side.

The forward extension portion 373 extends forwardly upward. A lower surface of the forward extension portion 373 is connected to the front surface of the vertical wall portion 372 by ribs 375, 375. A pair of left and right ribs 375, 375 extend downward from left and right side edges of the forward extension portion 373, and their rear ends are connected to left and right side edge portions of the front surface of the vertical wall portion 372. Front edges of the ribs 375, 375 are inclined rearwardly downward in side view of the vehicle. Lower end portions 375a of the ribs 375, 375 are connected to an upper portion of the flange-shaped upper joint portion 347. The ribs 375, 375 extend from the upper joint portion 347 to a lower surface of the forward extension portion 373.

The mounting hole 374 is a round hole. The mounting hole 374 is provided in the forward extension portion 373 at a position between the left and right ribs 375, 375.

A cylindrical collar member 376 having a vibration-proofing property is fitted into the mounting hole 374, and a tank fixture 339a is inserted in and passed through a hole of the collar member 376 from above. The tank fixture 339a is a bolt.

The tank fixture 339a fastens the front mounting stay 337 to a body frame F (FIG. 19) through the collar member 376.

As depicted in FIG. 25, the vertical wall portion 372 of the front mounting stay 337 extends upward from the upper surface 330a of the upper half 345 that is spaced upward from the upper joint surface 347c and the lower joint surface 348c. In other words, the front mounting stay 337 is provided to be integral with the upper half 345 at a position vertically spaced from the upper joint surface 347c and the lower joint surface 348c.

As a result, external forces transmitted through the front mounting stay 337 to the upper half 345 are not concentrated on the upper joint surface 347c or the lower joint surface 348c, but are dispersed to an upper surface portion of the upper half 345. Therefore, influences of the external forces on the barrier layer 336 in the vicinity of the upper joint surface 347c and the lower joint surface 348c can be reduced, and the barrier layer 336 can be protected effectively.

An upper surface of the forward extension portion 373 is provided, between the mounting hole 374 and the vertical wall portion 372, with an upper surface groove 373a extending in the width direction of the fuel tank main body 335.

In addition, a lower surface of the forward extension portion 373 is provided, between the mounting hole 374 and the front end of the forward extension portion 373, with a lower surface groove 373b extending in the longitudinal vehicle direction.

At the parts where the upper surface groove 373a and the lower surface groove 373b are provided, the plate thickness of the forward extension portion 373 is reduced, and the strength of the forward extension portion 373 is lowered. In other words, the upper surface groove 373a and the lower surface groove 373b are brittle portions where the strength of the forward extension portion 373 is lowered. The strength of the forward extension portion 373 is lowered at the parts of the upper surface groove 373a and the lower surface groove 373b provided in the surroundings of the mounting hole 374.

In the case where an excessive external force acts on the front mounting stay 337, the front mounting stay 337 is precedingly broken at around the upper surface groove 373a and the lower surface groove 373b, and part of the external force is absorbed in the front mounting stay 337. Therefore, transmission of the excessive external force through the front mounting stay 337 to the barrier layer 336 can be restrained, and the barrier layer 336 can be protected.

The fuel tank main body 335 is provided, on the upper surface 330a of the fuel tank main body 335, with the seat engagement section 380 (FIG. 19) and the tray 333 (FIG. 19), as exterior parts which are integrally molded together with the fuel tank main body 335.

Here, the upper surface 330a of the fuel tank main body 335 is that part of an outer surface of the upper half 345 which is exclusive of the part of the flange-shaped upper joint portion 347. In addition, the upper surface 330a is a part opposite, in the plate thickness direction of the fuel tank main body 335, to the barrier layer 336 provided as the shaped body 50a on the inner surface of the fuel tank main body 335.

Referring to FIGS. 19 to 21, a lower surface portion of a front end portion of the seat 13 is engaged with the seat engagement section 380.

The seat 13 includes a cushion 381, a seat bottom plate 382 supporting the cushion 381 from below, and a seat cover 383 covering the cushion 381 from above. The seat 13 is an exterior part constituting a part of the external surface of the motorcycle 1, and is disposed in proximity to the fuel tank 330.

In side view of FIG. 21, a front portion of the seat bottom plate 382 is inclined forwardly upward so as to lie along a rear portion of the upper surface 330a of the fuel tank main body 335.

The seat bottom plate 382 is provided, at a lower surface of a front end portion thereof, with a mounting hook member 384 projecting forward. The mounting hook member 384 extends forward so as to lie along a lower surface of the seat bottom plate 382.

The seat 13 is fixed to the fuel tank main body 335, through engagement of the mounting hook member 384 with the seat engagement section 380 of the fuel tank main body 335 from the rear side.

Referring to FIGS. 20, 21 and 23, the seat engagement section 380 includes a pair of connection base portions 385, 385 (connection portions) that extend from the upper surface 330a toward an outer and upper side of the fuel tank main body 335 and are spaced from each other in the width direction, and a flange portion 386 provided at an upper end of each connection base portion 385.

The connection base portions 385, 385 are erectly provided at the upper surface 330a in the center in regard of the vehicle width direction of the fuel tank main body 335. The connection base portions 385, 385 are connection portions for the upper surface 330a, extend in a longitudinal direction, and are spaced from each other in the vehicle width direction. The connection base portions 385, 385 are formed in a wall shape having a rectangular sectional shape, and function also as reinforcement members for the fuel tank main body 335.

The fuel tank main body 335 extends longer in the longitudinal vehicle direction than in the vehicle width direction. The base portions 385, 385 are so sized that their width D1 in the vehicle width direction is greater than their length D2 in the longitudinal vehicle direction, which is the longitudinal direction of the fuel tank main body 335.

The flange portion 386 extends from the upper end of each connection base portion 385 toward an outer side in regard of the vehicle width direction.

When viewed in the longitudinal vehicle direction, as depicted in FIG. 23, the seat engagement section 380 is formed in a T shape by the connection base portions 385, 385 and the flange portions 386, 386. Note that the flange portion 386 may be provided on only one side in regard of the vehicle width direction of the upper ends of the connection base portions 385, 385 such that the seat engagement section 380 is formed in an L shape.

The mounting hook member 384 of the seat bottom plate 382 includes a pair of left and right hook portions 384*a*, 384*a* extending forward while being bifurcated.

The mounting hook member 384 is provided in such a manner as to fit the connection base portions 385, 385 in between the left and right hook portions 384*a*, 384*a*, and is engaged with the seat engagement section 380 in such a manner that the hook portions 384*a*, 384*a* make contact with a lower surface of the flange portion 386.

The seat engagement section 380 is a resin part molded integrally with the fuel tank main body 335 at the time of injection molding depicted in FIG. 5. Therefore, the seat engagement section 380 can be provided in a simpler structure, as compared to the configuration in which a seat engagement section as a part separate from the fuel tank main body 335 is mounted to the fuel tank main body 335 by a fixture or the like. In addition, since the seat engagement section 380 can be provided utilizing a wide range of the upper surface 330*a* of the fuel tank main body 335, the degrees of freedom concerning the shape and the layout position of the seat engagement section 380 are high, and the degree of freedom in design can be enhanced.

Besides, since the seat engagement section 380 functions as a reinforcement rib for the upper surface 330*a* of the fuel tank main body 335, deformation of the fuel tank main body 335 in response to an external force can be reduced, a load acting on the barrier layer 336 can be reduced, and deformation of the barrier layer 336 can be restrained.

Further, since the connection base portions 385, 385 of the seat engagement section 380 extend longer in the longitudinal direction of the fuel tank main body 335, the rigidity of the fuel tank main body 335 in the longitudinal direction can be effectively increased by the connection base portions 385, 385. Note that by regulating the size of the connection base portions 385, 385, it is possible to adjust the rigidity of the fuel tank main body 335.

In the present embodiment, the fuel tank main body 335 is formed by injection molding onto the barrier layer 336 preliminarily made to be the shaped body 50*a* as in FIG. 5, and, therefore, generation of a notch N in the inner surface of the fuel tank main body 335 can be prevented. Accordingly, as compared to a forming method by blow molding in a comparative example depicted in FIG. 26, generation of a recess or wrinkle in the barrier layer 336 can be restrained, the barrier layer 336 can generally be made to be a flat portion being substantially parallel to the upper surface 330*a* and having a substantially uniform thickness, and a good barrier layer 336 can be formed on the inner surface of the fuel tank main body 335.

Referring to FIGS. 20, 21, 24 and 25, the tray 333 integrally includes an annular surrounding wall 390 projecting from the upper surface 330*a* of the fuel tank main body 335 toward the outside of the fuel tank main body 335, and a bottom wall 391 provided on the inner circumference side of the surrounding wall 390.

The surrounding wall 390 is formed in a cylindrical shape which is provided to be substantially coaxial with the cylindrical injection section 340 and to be larger in diameter than the cylindrical injection section 340. The surrounding wall 390 projects upward from the upper surface 330*a*, and surrounds the oil filler port 331 of the cylindrical injection section 340 from the outside.

The surrounding wall 390 is formed in an annular shape such as to surround part of the surface of the upper surface 330*a*. A lower end portion of the surrounding wall 390 is a connection portion 390*b* (FIG. 25) of the surrounding wall 390 for the upper surface 330*a*. This connection portion 390*b* spreads in an annular shape on the plane of the upper surface 330*a*, and is spaced apart in the plane directions (extending directions of the plane) of the upper surface 330*a*. For example, a front portion and a rear portion of the connection portion 390*b* are opposed to each other, and are spaced apart from each other in a plane direction of the upper surface 330*a*. In addition, a left portion and a right portion of the connection portion 390*b* are opposed to each other, and are spaced apart from each other in a plane direction of the upper surface 330*a*.

Thus, since the surrounding wall 390 spreads in the plane directions of the upper surface 330*a*, the rigidity of the upper surface 330*a* of the fuel tank main body 335 can be increased effectively.

A front portion of the surrounding wall 390 is located between the front mounting stay 337 and the cylindrical injection section 340 in the longitudinal vehicle direction.

The bottom wall 391 is a circular disk-shaped portion provided between an outer peripheral portion of the cylindrical injection section 340 and an inner peripheral portion of the surrounding wall 390, and is composed of part of the upper surface 330*a*.

Specifically, the tray 333 is formed in a dish shape by the bottom wall 391 and the surrounding wall 390 projecting upward from the bottom wall 391, and the cylindrical injection section 340 is located substantially in the center of the tray 333.

The fuel spilling from the cylindrical injection section 340 at the time of oil supply or the like is received by the bottom wall 391 and is dammed up by the surrounding wall 390, before being discharged downward through the drain pipe 333*a* (FIG. 19).

A front end portion of the tray 333 is integrally connected to the front mounting stay 337.

Specifically, the reinforcement ribs 371, 371 of the front mounting stay 337 are provided such as to intersect the circumference of the surrounding wall 390 from the front side, and a front end portion 390*a* of the surrounding wall 390 is integrally connected to the reinforcement ribs 371, 371. The front end portion 390*a* of the surrounding wall 390 interconnects the left and right reinforcement ribs 371, 371 in the vehicle width direction at a position between the vertical wall portion 372 and the reinforcement ribs 371, 371.

The tray 333 is a resin portion molded integrally with the fuel tank main body 335 at the time of injection molding depicted in FIG. 5. Therefore, the tray 333 can be provided in a simpler structure, as compared to the configuration in which a fuel tray as a part separate from the fuel tank main body 335 is mounted to the fuel tank main body 335 by a fixture or the like. In addition, since the tray 333 can be provided utilizing a wide range of the upper surface 330a of the fuel tank main body 335, the degrees of freedom concerning the shape and layout position of the tray 333 are high, and the degree of freedom in design can be enhanced.

Besides, since the surrounding wall 390 functions as a reinforcement rib for the upper surface 330a of the fuel tank main body 335, deformation of the fuel tank main body 335 in response to an external force can be reduced, a load acting on the barrier layer 336 can be reduced, and deformation of the barrier layer 336 can be restrained.

Further, since the front end portion 390a of the surrounding wall 390 of the tray 333 and the reinforcement ribs 371, 371 of the front mounting stay 337 are integrally connected, the rigidities of the tray 333 and the front mounting stay 337 can be mutually increased.

In addition, since in the tray 333, also, a notch N described in the comparative example in FIG. 26 can be prevented from being generated in the vicinity of the surrounding wall 390, it is possible to form a uniform barrier layer 336 on the inner surface side of the tray 333.

As has been described above, according to the third embodiment to which the present invention has been applied, the resin-made fuel tank 330 of the motorcycle 1 includes the resin-made fuel tank main body 335, and the barrier layer 336 that is provided on the inner surface of the fuel tank main body 335 and reduces permeation of the fuel from the fuel tank main body 335. The barrier layer 336 is provided as a shaped body 50a shaped along an inner surface of the fuel tank main body 335. The seat engagement section 380 as an exterior part to be connected to the upper surface 330a by the connection base portions 385, 385 that project outward and are spaced apart in a plane direction of the upper surface 330a, which is an outer surface of the fuel tank main body 335 opposite to the shaped body 50a, is integrally molded on the upper surface 330a. In addition, the tray 333 as an exterior part to be connected to the upper surface 330a by the connection portion 390b that protrudes outward and is spaced apart in a plane direction of the upper surface 330a is integrally molded on the upper surface 330a.

According to this configuration, the seat engagement section 380 and the tray 333 that project outward are integrally molded on the upper surface 330a opposite to the barrier layer 336 provided as the shaped body 50a, and, therefore, the seat engagement section 380 and the tray 333 as exterior parts can be provided on the upper surface 330a with a high degree of freedom. Further, the seat engagement section 380 and the tray 333 that are provided on the upper surface 330a of the fuel tank main body 335 function as reinforcement ribs, and deformation of the fuel tank main body 335 in response to an external force can be restrained, and, therefore, deformation of the barrier layer 336 can be restrained. Since the connection base portions 385, 385 are spaced from each other in a plane direction of the upper surface 330a, rigidity of the fuel tank main body 335 can be enhanced in the plane direction of the upper surface 330a. In addition, since the connection portion 390b of the tray 333 for the upper surface 330a has its components spaced apart in the plane direction of the upper surface 330a, the rigidity of the fuel tank main body 335 can be enhanced in the plane direction of the upper surface 330a. Besides, since the fuel tank main body 335, the seat engagement section 380 and the tray 333 are integrally molded on the upper surface 330a of the fuel tank main body 335 that is opposite to the shaped body 50a, generation of a notch N on the inner surface side of the fuel tank main body 335 due to the influence of the seat engagement section 380 and the tray 333 can be prevented, and, therefore, a uniform barrier layer 336 can be formed even in areas where the seat engagement section 380 and the tray 333 are provided. Accordingly, permeation of the fuel from the fuel tank main body 335 can be reduced effectively.

In addition, the fuel tank main body 335 is formed on the shaped body 50a by injection molding. According to this configuration, since the fuel tank main body 335 is formed on the barrier layer 336, or the shaped body 50a, by injection molding, generation of a notch N on the inner surface side of the fuel tank main body 335 can be prevented, and a uniform barrier layer 336 can be formed. Besides, the degree of freedom in molding is enhanced, and the shapes of the seat engagement section 380 and the tray 333 integrally molded with the fuel tank main body 335 can be diversified.

Besides, the seat engagement section 380 includes the connection base portions 385, 385 that project outward from the upper surface 330a, extend in the longitudinal direction of the fuel tank main body 335 and are spaced apart in the width direction, and the flange portions 386, 386 provided at end portions in regard of the projecting direction of the connection base portions 385, 385.

According to this configuration, the fuel tank main body 335 can be effectively reinforced in the longitudinal direction by the connection base portions 385, 385 of the seat engagement section 380 that extends in the longitudinal direction of the fuel tank main body 335, and adjustment of strength can also be made by regulating the length of the connection base portions 385, 385. In addition, since the connection base portions 385, 385 are spaced from each other in the width direction, the fuel tank main body 335 can be reinforced in the width direction. Besides, since it is unnecessary to provide the mounting hook member 384 of the seat 13 with an exclusive-use mounting member as a part separate from the fuel tank main body 335, a reduction in the number of component parts and a reduction in weight can be realized.

Further, an exterior part provided on the fuel tank main body 335 is the surrounding wall 390 that protrudes outward from the upper surface 330a and surrounds the surface of the upper surface 330a, and the fuel tank main body 335 is provided with the oil filler port 331 for the fuel in an area surrounded by the surrounding wall 390. According to this configuration, the surrounding wall 390 surrounding the oil filler port 331 can be used as a tray 333 for receiving the fuel spilling from the oil filler port 331, a tray part for exclusive use can be omitted, and the number of component parts can be reduced. Further, the fuel tank main body 335 can be reinforced in the plane directions of the upper surface 330a by the surrounding wall 390, so that deformation of the barrier layer 336 can be restrained.

In addition, the fuel tank main body 335 includes the front mounting stay 337 for fixing the fuel tank main body 335, and the surrounding wall 390 is integrally connected to at least part of the front mounting stay 337. According to this configuration, since the front mounting stay 337 can be reinforced by the surrounding wall 390, support rigidity of the fuel tank main body 335 is enhanced, and the capacity of the fuel tank main body 335 can be enlarged.

Beside, the front mounting stay 337 includes the stay main body section 370, and the reinforcement ribs 371, 371 extending from the stay main body section 370 toward the oil filler port 331 side and connected to the upper surface 330a, and the reinforcement ribs 371, 371 are connected to the surrounding wall 390. According to this configuration, the front mounting stay 337 can be reinforced by the reinforcement ribs 371, 371; in addition, even in the case where the front mounting stay 337 and the oil filler port 331 are remote from each other, the surrounding wall 390 and the front mounting stay 337 can be connected by the reinforcement ribs 371, 371, so that the degree of freedom in design can be enhanced.

Note that the third embodiment as above is merely a mode of application of the present invention, and the present invention is not to be limited to or by the third embodiment.

While the seat engagement section 380 and the tray 333 as exterior parts have been described to be provided on the upper surface 330a of the fuel tank main body 335 in the third embodiment, the exterior parts need only be provided on an outer surface of the fuel tank main body 335, and may be integrally molded on a lower surface of the fuel tank main body 335.

While the upper half 345 and the lower half 346 have been depicted as examples of the divided bodies constituting the fuel tank main body 335 in the third embodiment, the present invention is not limited to this, and the fuel tank main body 335 may be divided into three or more divided bodies. For example, the lower half 346 may be joined to an upper half composed of two divided bodies, to form a fuel tank main body.

DESCRIPTION OF REFERENCE SYMBOLS 30, 230, 330 Fuel tank (Resin-made fuel tank)
35, 235, 335 Fuel tank main body
36, 336 Barrier sheet layer (Barrier layer)
37, 237, 337 Front mounting stay (Mounting stay)
38L, 38R Rear mounting stay (Mounting stay)
39a, 39b Tank fixture (Fixture)
45, 245, 345 Upper half
46, 246, 346 Lower half
47 Upper joint portion (Flange portion)
47c, 347c Upper joint surface (Joint surface)
48 Lower joint portion (Flange portion)
48c, 348c Lower joint surface (Joint surface)
50a Shaped body
71a Upper surface groove (Brittle portion, Groove)
71b Lower surface groove (Brittle portion, Groove)
72, 82 Mounting hole
74, 74 Reinforcement rib (Rib)
83, 83 Reinforcement rib (Rib)
83b, 83b Groove (Brittle portion)
330a Upper surface (Outer surface)
331 Oil filler port (Injection port)
333 Tray (Exterior part)
370 Stay main body section
371, 371 Reinforcement rib
380 Seat engagement section (Exterior part)
385, 385 Connection base portion (Connection portion)
386, 386 Flange portion
390 Surrounding wall
390b Connection portion

The invention claimed is:

1. A resin-made fuel tank comprising:
a resin-made fuel tank main body provided by joining an upper half and a lower half;
a barrier sheet layer that is provided on an inner surface of the fuel tank main body and that reduces permeation of a fuel from the fuel tank main body; and
mounting stays for mounting the fuel tank main body to a vehicle body,
wherein the mounting stays are provided on the fuel tank main body at positions vertically spaced from a joint surface at which the upper half and the lower half are mated and joined to each other,
the mounting stays include a front mounting stay extending upward from an upper surface of the upper half and rear mounting stays extending downward from a lower surface of the lower half, the upper surface of the upper half being spaced upward from the joint surface, the lower surface of the lower half being spaced downward from the joint surface,
the front mounting stay is singularly provided to the upper half at a front portion of the fuel tank main body, the rear mounting stays include a pair of left and right rear mounting stays that are provided to the lower half at a rear portion of the fuel tank main body,
the pair of the left and right rear mounting stays are spaced from each other in a left-right direction,
the fuel tank main body is supported to the vehicle body by a three-point support of the front mounting stay and the pair of the left and right rear mounting stays,
the fuel tank main body is provided with a cylindrical injection section, for fuel injection, which is a cylinder and which is behind the front mounting stay at an upper portion of a front portion of the upper half, and
a rear surface rib is provided which connects a portion, in the upper surface of the upper half, that is located forward of the cylindrical injection section to a rear surface of the front mounting stay.

2. The resin-made fuel tank according to claim 1, wherein the mounting stays are provided with a mounting hole through which to pass a fixture fixed to the vehicle body, and
the mounting stays are provided with a brittle portion in a vicinity of the mounting hole.

3. The resin-made fuel tank according to claim 2, wherein the brittle portion is a groove provided in a periphery of the mounting hole.

4. The resin-made fuel tank according to claim 1, wherein the joint surface is provided at a flange portion extending to outside of the fuel tank main body, and
the mounting stays are provided with a rib extending from the flange portion.

5. The resin-made fuel tank according to claim 1, wherein the barrier sheet layer is provided as a shaped body shaped along an inner surface of the fuel tank main body, and
an outer surface of the fuel tank main body that is opposite to the shaped body is integrally molded with an exterior part connected to the outer surface by connection portions that protrude outward and are spaced apart from each other in a plane direction of the outer surface.

6. The resin-made fuel tank according to claim 5, wherein the fuel tank main body is formed by injection molding in relation to the shaped body.

7. The resin-made fuel tank according to claim 5, wherein the exterior part includes connection bases that project outward from the outer surface, extend in a longitudinal direction of the fuel tank main body and are spaced apart in a width direction, and flange portions provided at end portions in regard of a projecting direction of the connection bases.

8. The resin-made fuel tank according to claim 5, wherein the exterior part is a surrounding wall that projects outward from the outer surface and surrounds a surface of the outer surface, and the fuel tank main body is provided in a portion surrounded by the surrounding wall with a liquid injection port.

9. The resin-made fuel tank according to claim 8,
wherein the mounting stays are provided with a stay main body section, and a reinforcement rib that extends from the stay main body section toward the injection port side and is connected to the outer surface, and the reinforcement rib is connected to the surrounding wall.

10. The resin-made fuel tank according to claim 1,
wherein the front mounting stay includes a vertical wall portion extending upward from the upper surface of the upper half, a forward extension portion plate-shaped and extending forward from an upper end of the vertical wall portion, and a mounting hole provided to the forward extension portion and fixed to the vehicle body, the joint surface is provided at a flange portion extending to outside of the upper half, and the front mounting stay is provided with a rib connecting a lower surface of the forward extension portion to the flange portion.

* * * * *